United States Patent
Sone et al.

(10) Patent No.: US 7,514,168 B2
(45) Date of Patent: Apr. 7, 2009

(54) GAS-LIQUID SEPARATOR AND FUEL CELL

(75) Inventors: Koji Sone, Niihama (JP); Satoko Machida, Niihama (JP)

(73) Assignee: Panasonic Corporation, Osaka (JP)

( * ) Notice: Subject to any disclaimer, the term of this patent is extended or adjusted under 35 U.S.C. 154(b) by 828 days.

(21) Appl. No.: 10/893,578

(22) Filed: Jul. 19, 2004

(65) Prior Publication Data

US 2005/0058862 A1 Mar. 17, 2005

(30) Foreign Application Priority Data

Jul. 22, 2003 (JP) ............................. 2003-277194
Jan. 30, 2004 (JP) ............................. 2004-022329

(51) Int. Cl.
*H01M 8/04* (2006.01)
*H01M 2/00* (2006.01)
*B01D 53/22* (2006.01)

(52) U.S. Cl. .................. 429/22; 429/34; 96/6
(58) Field of Classification Search ............ 429/22, 429/34; 96/6
See application file for complete search history.

(56) References Cited

U.S. PATENT DOCUMENTS 5,130,024 A * 7/1992 Fujimoto et al. ........ 210/500.36

6,727,016 B2 * 4/2004 Bostaph et al. ................. 429/38

FOREIGN PATENT DOCUMENTS

| JP | 7-265634 | 10/1995 |
| JP | 9-313806 | 12/1997 |
| JP | 11-207154 | 8/1999 |
| WO | WO 85/00987 | 3/1985 |
| WO | WO8500987 A * | 3/1985 |
| WO | WO 95/06506 | 3/1995 |

* cited by examiner

*Primary Examiner*—Patrick Ryan
*Assistant Examiner*—Karie O'Neill
(74) *Attorney, Agent, or Firm*—Steptoe & Johnson LLP

(57) ABSTRACT

A gas-liquid separator for use in portable equipments, that can be made small, has a simple structure, can be manufactured at low costs, and carries out separation of gas and liquid with no problems occurring even if there is a change in orientation. The gas-liquid separator receives gas-containing liquid mixed with gas and performs gas-liquid separation into gas and liquid, and includes a gas-liquid separation chamber (8) for performing gas-liquid separation when gas-containing liquid is fed between a liquid extracting member (4) for passing the liquid therethrough while restricting the passage of gas therethrough and a gas extracting member (9) for passing gas therethrough while restricting the passage of liquid therethrough. The height (14) of the gas-liquid separation chamber (8) is set at not more than a maximum bubble growth diameter in the direction of gravity which depends on the surface tension of liquid. Thus, even when the gas-liquid separator is orientated such that the gas extracting member (9) is at the bottom in the direction of gravity, the liquid will not cover the gas extracting member (9) due to gravity and the outlet for gas will not be lost.

7 Claims, 19 Drawing Sheets

F I G. 4
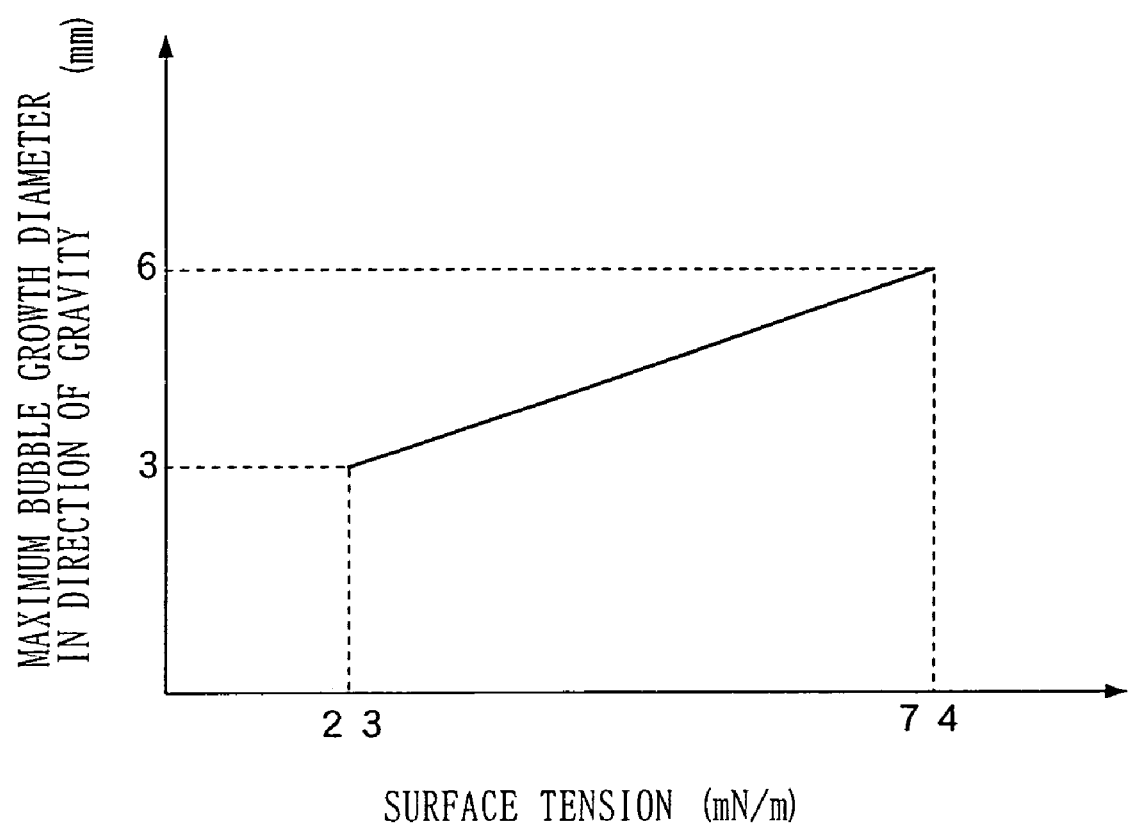

F I G. 11
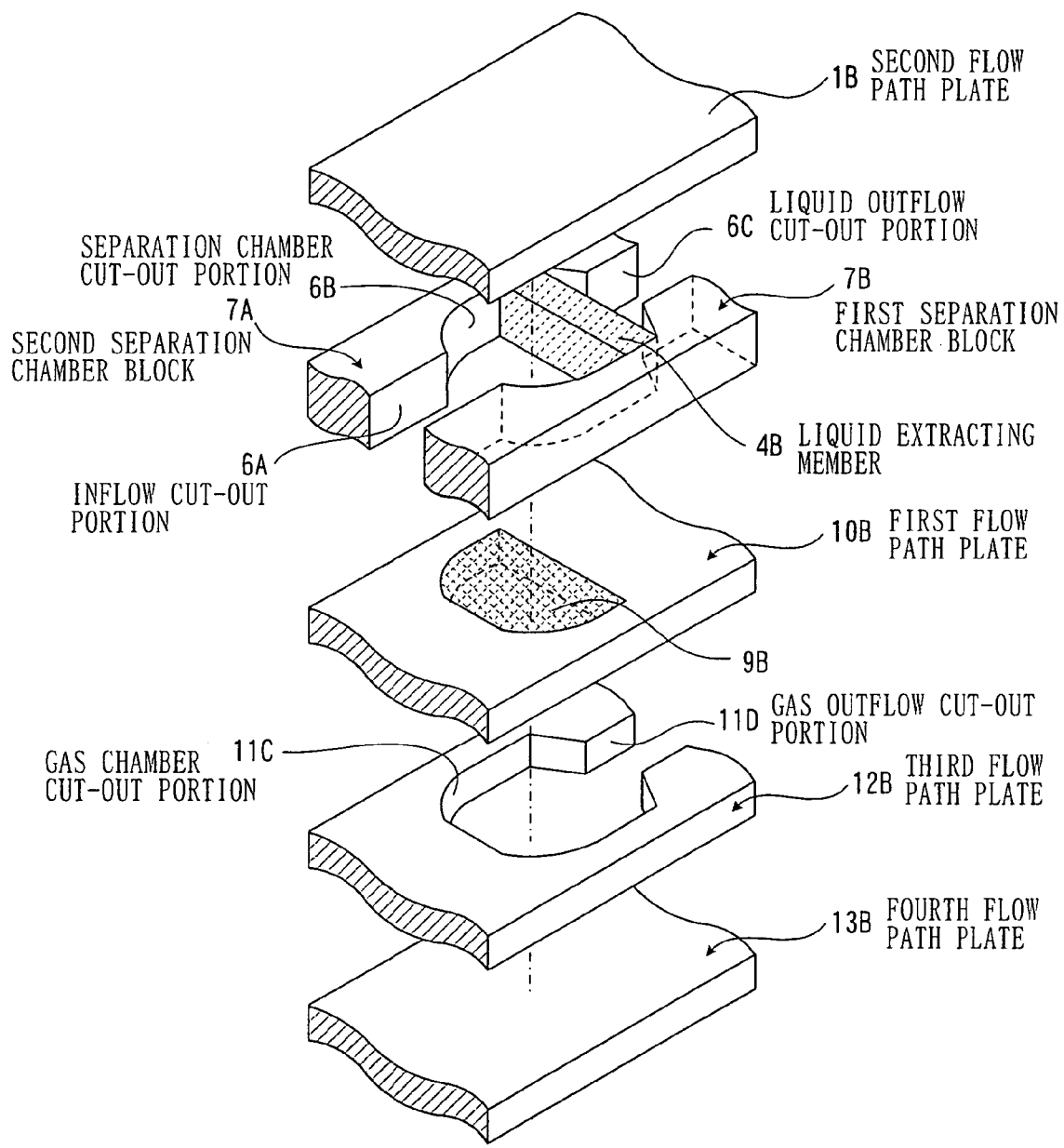

GAS-LIQUID SEPARATOR AND FUEL CELL

TECHNICAL FIELD

The present invention relates to gas-liquid separator that separates a gas-mixed fluid comprising liquid and gas into the gas and the liquid, and to a technology of a small fuel cell used in portable equipments in which the orientation of the gas-liquid separator changes. The gas-liquid separator of the present invention can be suitably used not only for gas-liquid separation in a fuel cell, but also gas-liquid separation in an infusion pump in medical equipments, gas-liquid separation in a microchemical analysis system, and so on.

BACKGROUND ART

Conventionally, at a fuel electrode in a methanol fuel cell, a methanol aqueous solution is consumed through a chemical reaction and carbon dioxide gas is produced. A gas-containing liquid comprising carbon dioxide gas and unreacted methanol aqueous solution is thus discharged from the fuel electrode side of the cell stack of the liquid fuel cell. The unreacted methanol is fed into a fuel adjusting chamber, and methanol and water are added in the fuel adjusting chamber to adjust to an optimum concentration and thus enable reuse; for this, it is necessary to separate out and discharge the bubbles of carbon dioxide gas from the gas-containing liquid.

A conventional gas-liquid separator used in a liquid fuel cell has a constitution in which the gas-containing liquid is separated into the gas and the liquid by gravity in a separating vessel, the gas is discharged from a gas outlet provided at the top, and the liquid is removed from an outlet provided at the bottom. The gas outlet at the top is closed off by a gas-liquid separating membrane that blocks the passage of the liquid and allows only the gas to pass therethrough, this being to prevent leakage of the liquid upon overturning. Such a constitution is proposed in, for example, Patent Document 1 (Japanese Patent Application Laid-open No. 4-229958, pages 2 to 3, FIG. 1) and Patent Document 2 (Japanese Patent Application Laid-open No. 11-128605, pages 2 to 3, FIG. 1).

Moreover, another example of a conventional gas-liquid separator is a gas-liquid separator used in a liquid degasifier. With this gas-liquid separator, hydrophobic porous hollow fiber membranes through which water passes with difficulty are disposed in a gas outlet, and hydrophilic porous hollow fiber membranes through which air passes with difficulty are disposed in a liquid outlet, and the two types of hollow fiber membranes are combined adjacent to one another. This constitution is proposed in, for example, Patent Document 3 (Japanese Patent Application Laid-open No. 7-265634, pages 2 to 3, FIG. 1) and Patent Document 4 (Japanese Patent Application Laid-open No. 9-313806, pages 2 to 4, FIG. 1).

However, with a gas-liquid separator having a constitution in which gravity is used as in Patent Document 1 or 2, if the gas-liquid separator becomes upside down, then a problem will arise in that the gas-liquid separating ability will be lost, this being due to the gas outlet which is now at the bottom being blocked by the liquid and hence the outlet for the gas being lost, the gas which is lighter than the liquid flowing out into the liquid outlet which is now at the top, and so on.

On the other hand, with a gas-liquid separator having a constitution in which porous hollow fibers and tubes are used as in Patent Document 3 or 4, the porous hollow fibers are expensive, and hence the apparatus itself becomes expensive. Moreover, the technique of disposing a large number of hollow fiber membranes and hermetically sealing the ends of the hollow fibers in the outlet region is difficult, and hence the apparatus cannot be made thin and small. Furthermore, a large amount of a filling adhesive is used in sealing the large number of porous hollow fibers, and hence leaching out of impurities from the filling adhesive into the solution becomes prone to occurring, and hence application to a solvent-based aqueous solution having high solubility toward resinous adhesives is not possible, and thus the range of solvents that can be used is narrow; there are thus many problems.

DISCLOSURE OF THE INVENTION

The present invention resolves the above problems of the prior art; it is an object of the present invention to provide a gas-liquid separator that can easily be made small, that has a simple structure and can be manufactured cheaply, and that enables separation of a gas and a liquid to be carried out with no problems occurring even if there is a change in orientation, and which can thus be used in portable equipment and so on, and a fuel cell using the gas-liquid separator.

A gas-liquid separator according to claim 1 of the present invention comprises a gas-liquid separation chamber that carries out gas-liquid separation upon a gas-containing liquid being fed in between a liquid extracting member that allows the passage of the liquid therethrough but restricts the passage of the gas therethrough and a gas extracting member that allows the passage of the gas therethrough but restricts the passage of the liquid therethrough, and is characterized in that a height of the gas-liquid separation chamber is set to be not more than a specific distance, specifically not more than a maximum bubble growth diameter in the direction of gravity which depends on the surface tension of the liquid, whereby the structure is such that even in the case of the gas-liquid separator being orientated such that the gas extracting member is at the bottom in the direction of gravity, the liquid will not cover the gas extracting member due to gravity and thus the outlet for the gas will not be lost.

According to this constitution, even if the gas-liquid separator becomes upside down, the gas will contact the gas extracting member and the liquid will contact the liquid extracting member. Hence a gas-liquid separator of a simple structure can be realized, that is small and thin, and can cope with all orientations.

Moreover, a gas-liquid separator according to claim 2 of the present invention is the gas-liquid separator according to claim 1, characterized in that the liquid extracting member is a plate or membrane of porous glass, or porous polytetrafluoroethylene that has been subjected to hydrophilic treatment.

A gas-liquid separator according to claim 3 of the present invention is the gas-liquid separator according to claim 1, characterized in that the gas extracting member is a plate or membrane of a material comprising porous glass as a substrate having a hydrophobic polymer such as a fluoropolymer applied onto the substrate surface containing pores, or a material manufactured by subjecting a fluorine-based substrate to perforation, or porous polytetrafluoroethylene.

A gas-liquid separator according to claim 4 of the present invention is the gas-liquid separator according to claim 1, characterized in that at least one of the gas extracting member and the liquid extracting member has a reinforcing porous plate disposed in close contact therewith.

A gas-liquid separator according to claim 5 of the present invention is the gas-liquid separator according to claim 1, characterized in that the gas-liquid separation chamber is formed from a plurality of walls including at least a specific wall that has disposed therein one extracting member out of the liquid extracting member and the gas extracting member, and a facing wall that faces the specific wall and has disposed therein the other extracting member out of the liquid extracting member and the gas extracting member, and the height of the gas-liquid separation chamber is the maximum gap between the specific wall and the facing wall.

A gas-liquid separator according to claim 6 of the present invention is the gas-liquid separator according to claim 1, characterized in that the gas-liquid separation chamber is formed from a plurality of walls including at least a specific wall that has disposed therein one extracting member out of the liquid extracting member and the gas extracting member, a facing wall that faces the specific wall, and a side wall that is between the specific wall and the facing wall and has disposed therein the other extracting member out of the liquid extracting member and the gas extracting member, and the height of the gas-liquid separation chamber is the maximum gap between the specific wall and the facing wall.

A gas-liquid separator according to claim 7 of the present invention is the gas-liquid separator according to claim 1, characterized in that the gas-liquid separator receives a gas-containing liquid comprising water and a gas into the gas-liquid separation chamber and carries out gas-liquid separation into the gas and the liquid, and the height of the gas-liquid separation chamber is not more than 6 mm.

A gas-liquid separator according to claim 8 of the present invention is the gas-liquid separator according to claim 1, characterized in that the gas-liquid separator receives a gas-containing liquid comprising a methanol aqueous solution and a gas into the gas-liquid separation chamber and carries out gas-liquid separation into the gas and the liquid, and the height of the gas-liquid separation chamber is not more than 3 mm.

A gas-liquid separator according to claim 9 of the present invention is a gas-liquid separator that receives a gas-containing liquid having a gas mixed therein and carries out separation into the gas and the liquid, and is characterized by comprising a first flow path plate having formed therein an inflow cut-out portion through which the gas-containing liquid flows in, and a separation chamber cut-out portion that is communicated with the inflow cut-out portion and stores the gas-containing liquid that has flowed in, a second flow path plate that is provided adjoining a surface of the first flow path plate, and closes off one face of the inflow cut-out portion, and moreover has installed therein a liquid extracting member that allows the passage of the liquid therethrough but restricts the passage of the gas therethrough in a position in correspondence with one face of the separation chamber cut-out portion, a third flow path plate that is provided adjoining a surface of the first flow path plate, and closes off the other face of the inflow cut-out portion, and moreover has installed therein a gas extracting member that allows the passage of the gas therethrough but restricts the passage of the liquid therethrough in a position in correspondence with one face of the separation chamber cut-out portion, a fourth flow path plate that is provided adjoining one surface of the second flow path plate, and has formed therein a liquid chamber cut-out portion that stores liquid separated out and extracted by the liquid extracting member, and a liquid outflow cut-out portion that is communicated with the liquid chamber cut-out portion and through which the liquid that has been separated out and extracted flows, a fifth flow path plate that is provided adjoining the other surface of the fourth flow path plate, and closes off an opening of the liquid chamber cut-out portion and the liquid outflow cut-out portion, a sixth flow path plate that is provided adjoining one surface of the third flow path plate, and has formed therein a gas chamber cut-out portion that stores gas separated out and extracted by the gas extracting member, and a gas outflow cut-out portion that is communicated with the gas chamber cut-out portion and through which the gas that has been separated out and extracted flows, and a seventh flow path plate that is provided adjoining the other surface of the sixth flow path plate, and closes off an opening of the gas chamber cut-out portion and the gas outflow cut-out portion.

A gas-liquid separator according to claim 10 of the present invention is the gas-liquid separator according to claim 9, characterized in that the thickness of the first flow path plate is set to be not more than a maximum bubble growth diameter in the direction of gravity which depends on the surface tension of the liquid.

A gas-liquid separator according to claim 11 of the present invention is the gas-liquid separator according to claim 9 or 10, characterized in that instead of the second flow path plate, a liquid extracting membrane that has a size such as to cover an opening of the separation chamber cut-out portion and allows the passage of the liquid therethrough but restricts the passage of the gas therethrough is sandwiched between the first flow path plate and the fourth flow path plate.

A gas-liquid separator according to claim 12 of the present invention is the gas-liquid separator according to claim 9 or 10, characterized in that instead of the third flow path plate, a gas extracting membrane that has a size such as to cover an opening of the separation chamber cut-out portion and allows the passage of the gas therethrough but restricts the passage of the liquid therethrough is sandwiched between the first flow path plate and the sixth flow path plate.

A gas-liquid separator according to claim 13 of the present invention is the gas-liquid separator according to claim 9 or 10, characterized in that the fourth flow path plate and the fifth flow path plate are formed integrally with one another.

A gas-liquid separator according to claim 14 of the present invention is the gas-liquid separator according to claim 9 or 10, characterized in that the sixth flow path plate and the seventh flow path plate are formed integrally with one another.

A gas-liquid separator according to claim 15 of the present invention is the gas-liquid separator according to claim 9, characterized in that the gas-liquid separator receives a gas-containing liquid comprising water and a gas into the gas-liquid separation chamber and carries out gas-liquid separation into the gas and the liquid, and the height of the gas-liquid separation chamber is not more than 6 mm.

A gas-liquid separator according to claim 16 of the present invention is the gas-liquid separator according to claim 9, characterized in that the gas-liquid separator receives a gas-containing liquid comprising a methanol aqueous solution and a gas into the gas-liquid separation chamber and carries out gas-liquid separation into the gas and the liquid, and the height of the gas-liquid separation chamber is not more than 3 mm.

A gas-liquid separator according to claim 17 of the present invention is a gas-liquid separator that receives a gas-containing liquid having a gas mixed therein and carries out gas-liquid separation into the gas and the liquid, comprises a gas-liquid separation chamber that carries out gas-liquid separation upon the gas-containing liquid being fed in between a liquid extracting member that allows the passage of the liquid therethrough but restricts the passage of the gas therethrough and a gas extracting member that allows the passage of the gas therethrough but restricts the passage of the liquid therethrough, and is characterized in that one extracting member out of the liquid extracting member that allows the passage of the liquid therethrough but restricts the passage of the gas therethrough and the gas extracting member that allows the passage of the gas therethrough but restricts the passage of the liquid therethrough is disposed in one specific wall in the height direction of the gas-liquid separation chamber, and the other extracting member out of the liquid extracting member and the gas extracting member is disposed in a wall adjacent to the one specific wall up to the other specific wall in the height direction of the gas-liquid separation chamber, and a height of the gas-liquid separation chamber is set to be not more than a maximum bubble growth diameter in the direction of gravity which depends on the surface tension of the liquid.

A gas-liquid separator according to claim 18 of the present invention is the gas-liquid separator according to claim 17, characterized in that the gas-liquid separator receives a gas-containing liquid comprising water and a gas and carries out gas-liquid separation into the gas and the liquid, and the height of the gas-liquid separation chamber is not more than 6 mm.

A gas-liquid separator according to claim 19 of the present invention is the gas-liquid separator according to claim 17, characterized in that the gas-liquid separator receives a gas-containing liquid comprising a methanol aqueous solution and a gas and carries out gas-liquid separation into the gas and the liquid, and the height of the gas-liquid separation chamber is not more than 3 mm.

A gas-liquid separator according to claim 20 of the present invention is a gas-liquid separator that receives a gas-containing liquid in which a gas is mixed into a liquid and carries out gas-liquid separation into the gas and the liquid, and is characterized by comprising first and second gas-liquid separation chambers into which the gas-containing liquid is supplied, a liquid extracting member that is provided between the first gas-liquid separation chamber and the second gas-liquid separation chamber, and allows the passage of the liquid therethrough but restricts the passage of the gas therethrough, a first gas extracting member that is provided facing onto the first gas-liquid separation chamber, and allows the passage of the gas into a first gas flow path but restricts the passage of the liquid, and a second gas extracting member that is provided facing onto the second gas-liquid separation chamber, and allows the passage of the gas into a second gas flow path but restricts the passage of the liquid.

According to this constitution, not only in the case that a gas-containing liquid is supplied into the first gas-liquid separation chamber, but also in the case that a gas-containing liquid is supplied into the second gas-liquid separation chamber, the gas can be separated out from the gas-containing liquid well, and the liquid from which the gas has been removed can be passed through the liquid extracting member to the downstream side well. As a result, even in the case that a gas-containing liquid is supplied from either direction through the first and second gas-liquid separation chambers, liquid from which the gas has been removed only can be passed to the downstream side well.

A gas-liquid separator according to claim 21 of the present invention is the gas-liquid separator according to claim 20, wherein a height of the first gas-liquid separation chamber at a place facing onto the first gas extracting member, and a height of the second gas-liquid separation chamber at a place facing onto the second gas extracting member are each set to be not more than a maximum bubble growth diameter in the direction of gravity which depends on the surface tension of the liquid.

According to this constitution, regardless of what orientation the gas-liquid separation chamber is in, the gas in the gas-containing liquid supplied into the first gas-liquid separation chamber or the second gas-liquid separation chamber will contact the first or second gas extracting member before reaching the maximum bubble growth diameter, and hence will be discharged through this gas extracting member into the first or second gas flow path well.

A fuel cell according to claim 22 of the present invention is a fuel cell that contains two of the gas-liquid separators according to claim 20 or 21, and is characterized by comprising the first and second gas-liquid separators, a cell having a fuel electrode and an air electrode, first and second fuel tanks in which a liquid fuel is stored, first feeding means for feeding the liquid fuel in the first fuel tank out to the fuel electrode side, and second feeding means for feeding the liquid fuel in the second fuel tank out to the fuel electrode side, wherein the arrangement is such that the liquid fuel can be supplied in either direction between the first fuel tank and the second fuel tank via the fuel electrode, the first gas-liquid separator is provided between the fuel electrode and the first fuel tank, and the second gas-liquid separator is provided between the fuel electrode and the second fuel tank.

According to this constitution, when liquid fuel having mixed therein a gas generated at the fuel electrode is fed out to the first or second fuel tank side, the gas is separated out and removed by the first or second gas-liquid separator, and only the liquid fuel flows into the first or second fuel tank. Moreover, even if gas dissolved in the liquid fuel stored in the first or second fuel tank forms bubbles, when the gas-containing liquid is supplied from the first or second fuel tank to the fuel electrode side, the gas is separated out and removed by the first or second gas-liquid separator, and only the liquid fuel is supplied to the fuel electrode. As a result, the liquid fuel only can be supplied to the fuel electrode well.

A fuel cell according to claim 23 of the present invention is the fuel cell according to claim 22, characterized by being further provided with a first sensor that detects an amount of the liquid fuel in the first fuel tank, a second sensor that detects an amount of the liquid fuel in the second fuel tank, and a controller that carries out control such that, when a drop in the amount of the liquid fuel in the first fuel tank is detected by the first sensor in the case that the liquid fuel is being supplied from the first fuel tank to the second fuel tank side via the fuel electrode, the operation of supplying the liquid fuel from the first fuel tank is stopped and an operation of supplying the liquid fuel from the second fuel tank is commenced, and carries out control such that, when a drop in the amount of the liquid fuel in the second fuel tank is detected by the second sensor in the case that the liquid fuel is being supplied from the second fuel tank to the first fuel tank side via the fuel electrode, the operation of supplying the liquid fuel from the second fuel tank is stopped and an operation of supplying the liquid fuel from the first fuel tank is commenced.

According to this constitution, even in the case that the liquid fuel is supplied in from either direction, the gas is separated out and removed by the first or second gas-liquid separator, and hence mistaken detection of the amount of the liquid fuel by the first or second sensor can be kept down to a minimum, and moreover the liquid fuel can be supplied to the fuel electrode side from the first or second fuel tank via the first or second gas-liquid separator well.

As described above, according to a gas-liquid separator of the present invention, the height of the gas-liquid separation chamber is set to be not more than the maximum bubble growth diameter in the direction of gravity which depends on the surface tension of the liquid, and hence the gas-liquid mixed fluid can be separated into the gas and the liquid reliably at all orientations of the vessel. Moreover, by adopting the laminate structure of plates, the gas-liquid separator can be made small and thin, and hence can be suitably used in a fuel cell for portable equipment, or for gas-liquid separation on medical infusions, in a microchemical analysis system, or the like.

Moreover, according to a gas-liquid separator of the present invention, the structure has been made to be such that gas-liquid separation can be carried out regardless of the direction of flow of the liquid, and hence even in the case that the gas-containing liquid flows in both directions, the gas can be removed well and reliably, and the liquid only can be passed through well.

Moreover, by installing a gas-liquid separator having this constitution between the fuel electrode and the fuel tank in a fuel cell, in the case of a fuel cell in which the liquid fuel is supplied to the fuel electrode in both directions, even in the case that a dissolved gas such as carbon dioxide gas forms bubbles in a fuel tank, this gas can be discharged to the outside well, and hence the ability to supply the liquid fuel to the fuel electrode can be secured well, and thus the electricity generating performance and the reliability of the fuel cell can be improved. Moreover, in the case that sensors that detect the amount of the liquid fuel in the fuel tanks are provided, a situation in which bubbles in a fuel tank are detected by a sensor and hence it is mistakenly judged that the liquid fuel in the fuel tank has run out can be prevented, and hence the reliability can be improved.

BRIEF DESCRIPTION OF THE DRAWINGS

FIG. 4 is a graph showing a relationship between the surface tension of the liquid and the maximum bubble growth diameter in the direction of gravity according to the first embodiment and a fifth embodiment of the present invention;

FIG. 11 is an exploded perspective view of the fourth embodiment;

DESCRIPTION OF PREFERRED EMBODIMENTS

Following is a description of embodiments of the present invention and comparative examples with reference to FIGS. 1 to 19.

First Embodiment

Figure 5:
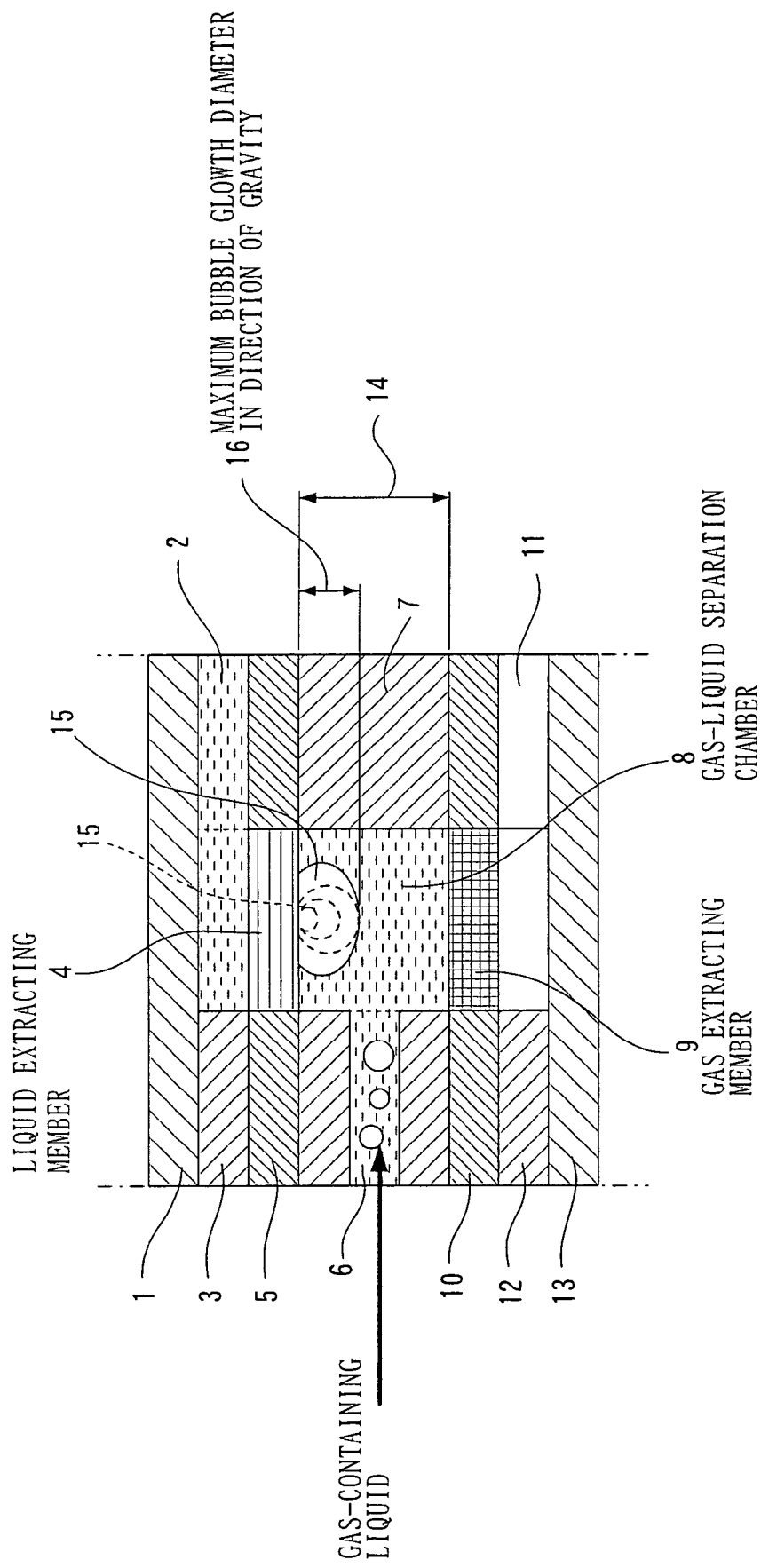
FIG. 5 is a sectional view showing a comparative example in which the height inside the gas-liquid separation chamber is high.

FIGS. 1 to 4 show a first embodiment of the present invention, and FIG. 5 shows a comparative example.

Figure 1:
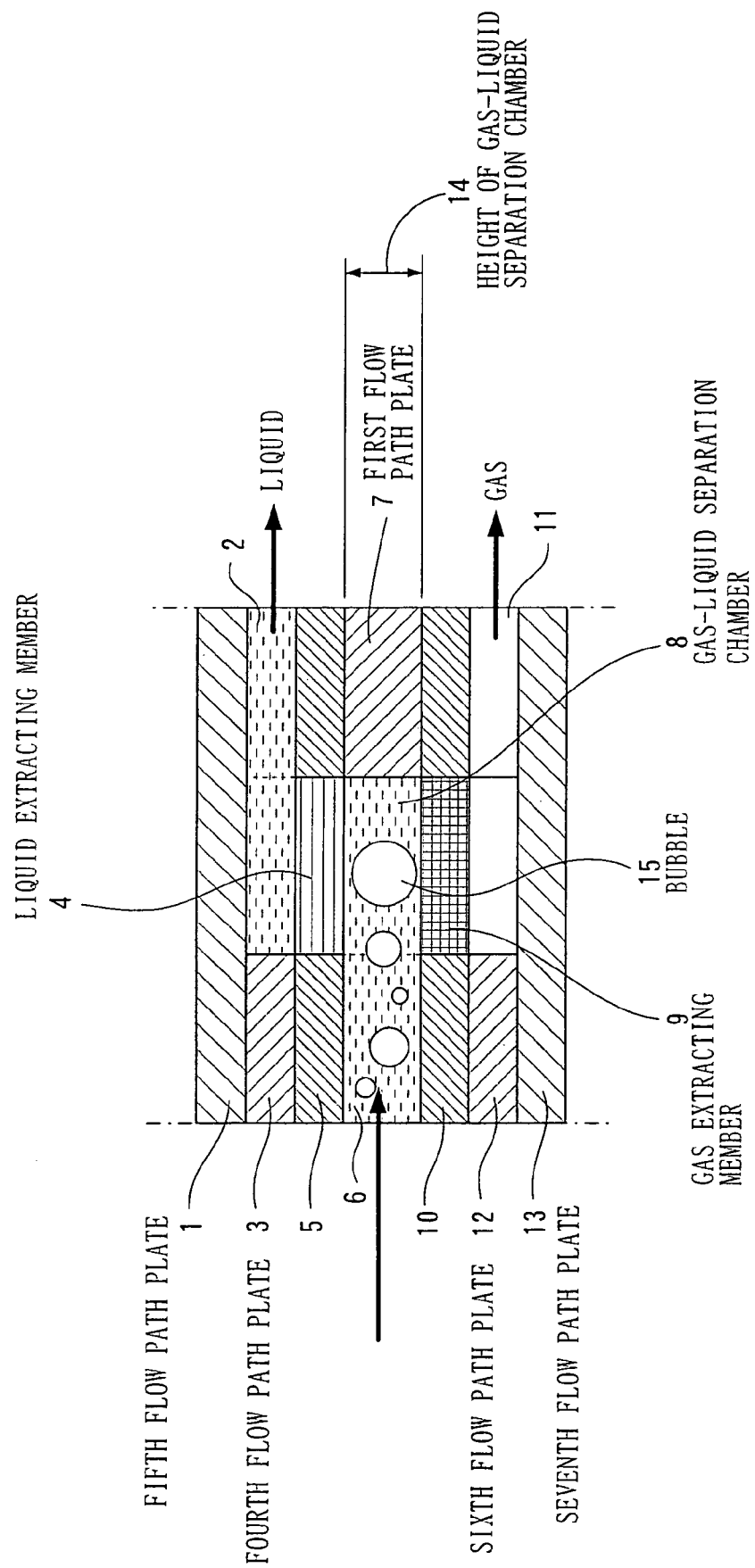
FIG. 1 is a sectional view of a gas-liquid separator according to a first embodiment of the present invention.
Figure 2:
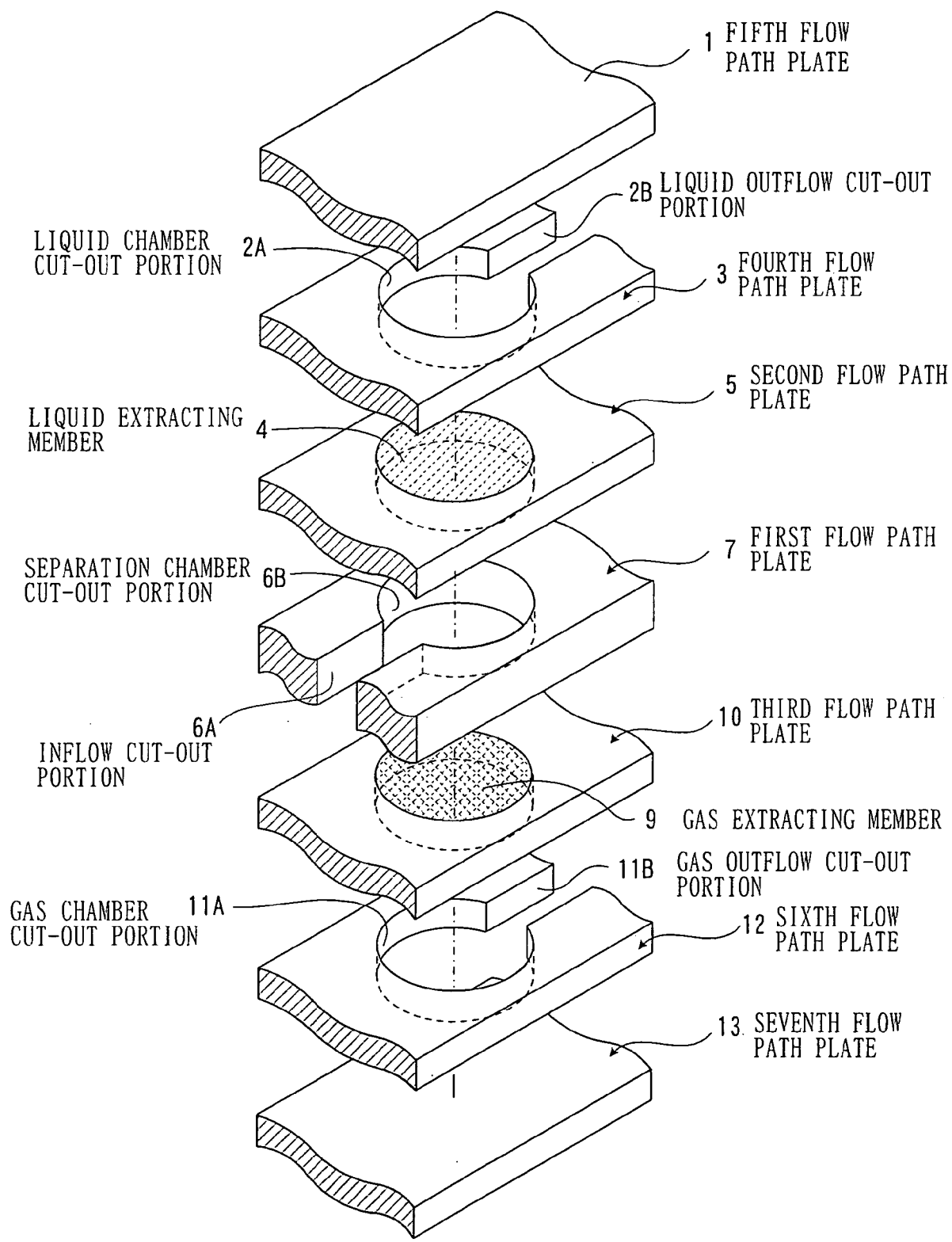
FIG. 2 is an exploded perspective view of the first embodiment.

As shown in FIGS. 1 and 2, a gas-liquid separator of the first embodiment has a constitution in which a first flow path plate 7 having formed therein an inflow cut-out portion 6A that constitutes part of an inflow path 6 through which a gas-containing liquid flows in is disposed in the center, a second flow path plate 5 having hermetically installed therein a liquid extracting member 4 that allows the passage of a liquid therethrough but restricts the passage of a gas therethrough, a fourth flow path plate 3 having formed therein a liquid outflow cut-out portion 2B through which liquid that has been separated out and extracted by the liquid extracting member 4 flows, and a fifth flow path plate 1 are laminated on one side of the first flow path plate 7, and a third flow path plate 10 having hermetically installed therein a gas extracting member 9 that restricts the passage of a liquid therethrough, a sixth flow path plate 12 having formed therein a gas outflow cut-out portion 11B through which gas that has been separated out and extracted by the gas extracting member 9 flows, and a seventh flow path plate 13 are laminated on the other side of the first flow path plate 7.

Specifically, the first flow path plate 7 has formed therein the inflow cut-out portion 6A through which the gas-containing liquid flows in, and a separation chamber cut-out portion 6B that is communicated with the inflow cut-out portion 6A and stores the gas-containing liquid that has flowed in.

The second flow path plate 5 that is provided adjoining a surface of the first flow path plate 7 closes off one face of the inflow cut-out portion 6A and moreover has installed therein the liquid extracting member 4 in a position in correspondence with one face of the separation chamber cut-out portion 6B. A hydrophilic material such as porous glass is used for the liquid extracting member 4.

The fourth flow path plate 3 that is provided adjoining the second flow path plate 5 has formed therein a liquid chamber cut-out portion 2A that stores the liquid separated out and extracted by the liquid extracting member 4, and the liquid outflow cut-out portion 2B is communicated with this liquid chamber cut-out portion 2A.

The fifth flow path plate 1 is provided adjoining the fourth flow path plate 3 and closes off an opening of the liquid chamber cut-out portion 2A and the liquid outflow cut-out portion 2B.

The third flow path plate 10 that is provided adjoining a surface of the first flow path plate 7 closes off the other face of the inflow cut-out portion 6A and moreover has installed therein the gas extracting member 9 in a position in correspondence with one face of the separation chamber cut-out portion 6B. A material comprising porous glass as a substrate having a hydrophobic polymer such as a fluoropolymer applied onto the substrate surface containing the pores or a material manufactured by subjecting a fluorine-based substrate to perforation is used for the gas extracting member 9.

The sixth flow path plate 12 that is provided adjoining one face of the third flow path plate 10 has formed therein a gas chamber cut-out portion 11A that stores the gas separated out and extracted by the gas extracting member 9, and the gas outflow cut-out portion 11B is communicated with this gas chamber cut-out portion 11A.

The seventh flow path plate 13 is provided adjoining the sixth flow path plate 12 and closes off an opening of the gas chamber cut-out portion 11A and the gas outflow cut-out portion 11B.

The laminated flow path plates are bonded and joined together hermetically, the openings of the inflow cut-out portion 6A are closed off by the second and third flow path plates 5 and 10 to form an inflow path 6 through which the gas-containing liquid flows in, a gas-liquid separation chamber 8 is formed by the separation chamber cut-out portion 6B, the liquid extracting member 4 and the gas extracting member 9, the openings of the liquid outflow cut-out portion 2B are closed off by the second and fifth flow path plates 5 and 1 to form a liquid outflow path 2 through which the separated liquid is discharged, and the openings of the gas outflow cut-out portion 11B are closed off by the third and seventh flow path plates 10 and 13 to form a gas outflow path 11 through which the separated gas is discharged.

In general, the passing pressure for the gas through the gas extracting member 9 and the passing pressure P for the liquid through the moistened liquid extracting member 4 are theoretically given by the following formula, taking the pore diameter of the porous material to be D, the surface tension of the liquid to be T, and the contact angle between the liquid and the porous material to be A.

$$P=(1/D) \cdot 4 \cdot T \cdot (\cos A)$$

Here, if the contact angle between the liquid and the porous material exceeds 90°, then a pressure P discharging the liquid from the pores will act. Here, in the case that the gas extracting member 9 is thin and can thus be deformed by the inflow pressure of the gas mixed fluid, a reinforcing porous plate, not shown in the drawings, that is in close contact with the gas extracting member 9 is preferably fixed on from the sixth flow path plate 12 side.

On the other hand, in the case that the contact angle between the liquid and the porous material is less than 90°, a pressure P that discharges gas from the pores into which the fluid has entered will act. Note, however, that in the case of being dry, even if the contact angle is less than 90°, if the value of the contact angle is high then a holding pressure will act when the liquid flows out from the pore outlets and hence it will become difficult for the liquid to permeate through; it is thus preferable for the contact angle to be close to 0°. Here, in the case that the liquid extracting member 4 is thin and can thus be deformed by the inflow pressure of the gas mixed fluid, again a reinforcing porous plate, not shown in the drawings, that is in close contact with the liquid extracting member 4 is preferably fixed on from the fourth flow path plate 3 side.

That is, in the case that the gas extracting member 9 or the liquid extracting member 4 is a thin membrane, the gas extracting member 9 or liquid extracting member 4 may bend and break due to the pressure of the gas or liquid, but as described above, this problem can be prevented by installing a reinforcing plate that has formed therein many holes (a mesh is also possible) having a size such as not to impede the flowing out of the gas or liquid and has a strength such as not to bend under the pressure of the flow of the gas or liquid, the reinforcing plate being installed on the gas or liquid outflow side of the gas extracting member 9 or liquid extracting member 4 membrane, i.e. outside the gas-liquid separation chamber 8.

Figure 3:
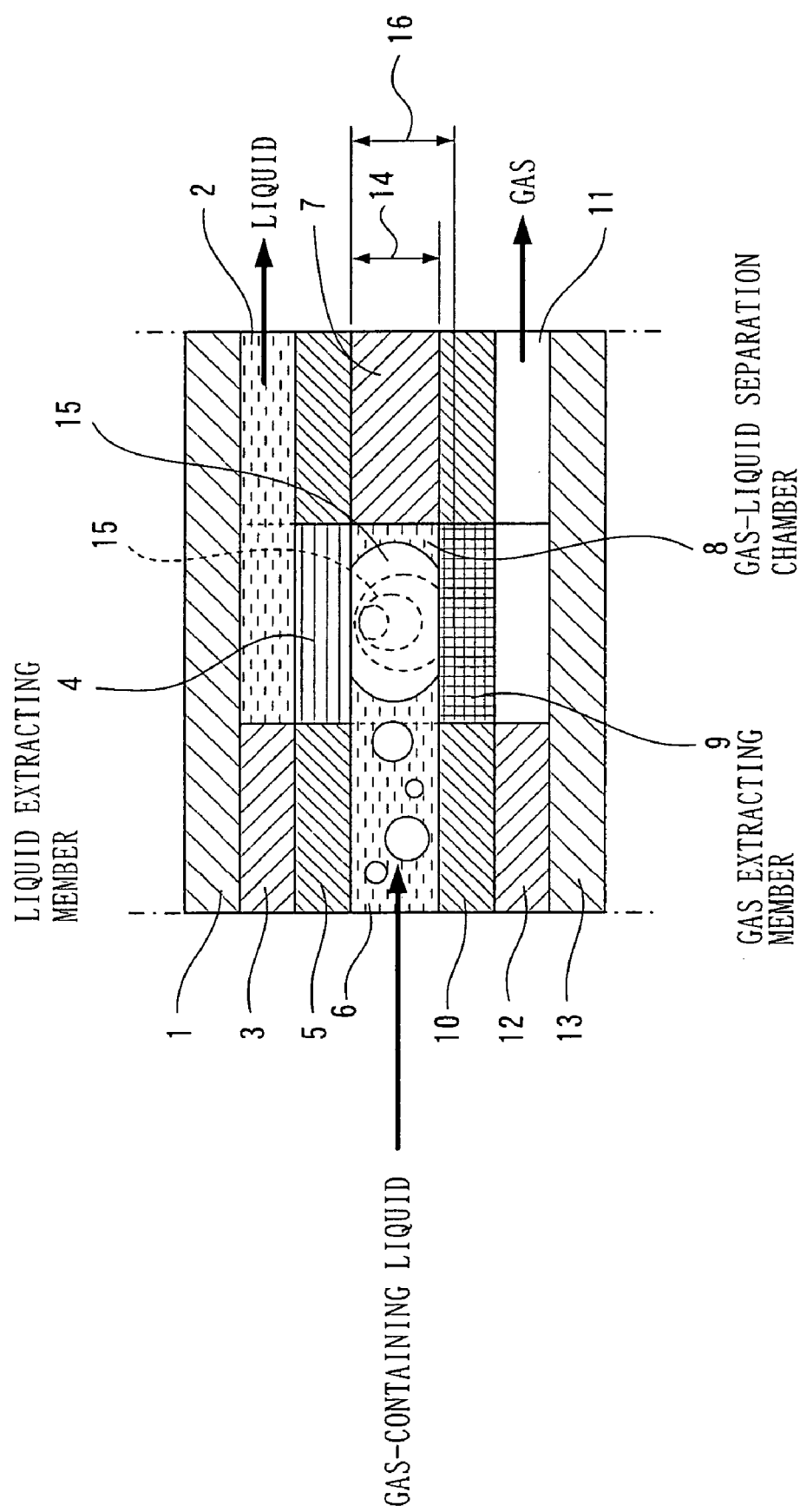
FIG. 3 is a sectional view showing an operation when the height inside a gas-liquid separation chamber of the gas-liquid separator of the first embodiment has been set to be not more than the maximum bubble growth diameter in the direction of gravity.

Furthermore, to set the height 14 of the gas-liquid separation chamber 8 formed by the liquid extracting member 4 and the gas extracting member 9 to be not more than a specific distance, here the thickness of the first flow path plate 7 is set as shown in FIGS. 3 and 4. A description will now be given comparing with the comparative example shown in FIG. 5.

The height 14 of the gas-liquid separation chamber 8 is formed through the liquid extracting member 4 and the gas extracting member 9 which are disposed facing each other; in the case that this height 14 is too great as shown in FIG. 5, if the orientation of the gas-liquid separator becomes such that the gas extracting member 9 is at the bottom in the direction of gravity, then the liquid will cover the gas extracting member 9 due to gravity, and thus the outlet for the gas will be lost, and hence the gas-liquid separating ability will be lost.

However, it was found through experiments that if the height 14 of the gas-liquid separation chamber 8 (the gap between the gas extracting member 9 and the liquid extracting member 4) is made to be not more than a specific distance, then a good separating ability is obtained. The gas-liquid separator did of course also function in all other orientations. That height is a height not more than the maximum bubble film growth height 16 in the direction of gravity.

As shown by the bubble 15 in FIG. 5, bubbles rise in the liquid due to buoyancy, and hence the bubble 15 sticks to the liquid extracting member 4 at the top in the direction of gravity. The liquid extracting member 4 allows the liquid to progressively permeate therethrough without allowing the gas to pass therethrough, and hence the bubbles gradually gather together and grow.

As shown by the dashed lines, as the bubble 15 grows the bubble shape progressively changes from a sphere to an oval shape due to buoyancy, and a phenomenon is observed in which once the volume of the bubble exceeds a certain value, change in the bubble diameter in the direction of gravity ceases, and the bubble expands in only the sideways direction. The distance at the time that the change in the bubble diameter in the direction of gravity ceases (the distance shown by arrow 16) is called the maximum bubble growth diameter in the direction of gravity.

As with the comparative example shown in FIG. 5, in the case that the height 14 of the gas-liquid separation chamber 8 as determined by the thickness of the first flow path plate 7 is greater than the maximum bubble growth diameter in the direction of gravity shown by the arrow 16, the liquid in the gas-liquid mixed fluid will cover the whole surface of the gas extracting member 9 which is at the bottom and hence the flowing out of the gas will cease. As the liquid passes through the liquid extracting member 4 which is at the top, bubbles will then stick to the surface of the liquid extracting member 4 and progressively grow, and eventually a bubble film of thickness equal to the maximum bubble growth diameter 16 in the direction of gravity will cover the liquid extracting member 4 and thus the discharge of the liquid will also stop, and hence the gas-liquid separating ability will be lost.

In contrast with this, as in the first example shown in FIG. 3, in the case that the thickness of the first flow path plate 7 is set such that the height 14 of the gas-liquid separation chamber 8 is not more than the maximum bubble growth diameter in the direction of gravity shown by the arrow 16, bubbles will grow on the surface of the liquid extracting member 4 but the bubbles will come into contact with the gas extracting member 9 before reaching the maximum bubble growth diameter, and hence the gas extracting member 9 will adsorb and absorb the bubbles and discharge the bubbles into the gas outflow path 11, and thus even in the worst case scenario that the gas extracting member 9 is at the bottom in the direction of gravity, the gas-liquid separation will be able to operate normally.

As shown in FIG. 4, this maximum bubble height 16 in the direction of gravity depends on the surface tension of the liquid, being approximately 6 mm in the case of pure water at 74 mN/m, and being approximately 3 mm in the case of methanol, ethanol or acetone at approximately 23 mN/m. That is, the limit value of the height 14 of the gas-liquid separation chamber 8 varies according to the surface tension of the liquid used.

Consequently, if the height 14 of the gas-liquid separation chamber 8 is made to be not more than 6 mm in the case that the liquid is water, or not more than approximately 3 mm in the case that the liquid is a methanol aqueous solution, then even if the gas-liquid separator has been turned on its side or upside down, the gas-liquid separator will operate reliably with no loss of the ability to separate the gas-liquid mixed fluid into the gas and the liquid.

Moreover, due to the simple structure in which the respective flow path plates are joined together on top of one another in this way, the height 14 of the gas-liquid separation chamber 8 can reliably be made to be a height not more than the maximum bubble growth diameter in the direction of gravity.

Verificatory experiments were carried out using as the gas extracting member 9 polytetrafluoroethylene (hereinafter abbreviated to 'PTFE') (substrate contact angle 108°) having a pore diameter of 1 µm and an opening ratio of approximately 80% stuck to an SUS reinforcing plate having 100 µm pores formed therein, and on the other hand using as the liquid extracting member 4 PTFE that had been subjected to hydrophilic treatment (substrate contact angle not more than 10°) having a pore diameter of 3 µm and an opening ratio of approximately 80% again stuck to an SUS reinforcing plate having 100 µm pores formed therein.

As a result, in the case that a gap between the gas extracting member 9 and the liquid extracting member 4 was made to be not more than the maximum bubble growth diameter in the direction of gravity, for both pure water and a 10 wt % methanol aqueous solution, with a gas-liquid mixed fluid pressure of at least approximately 200 mm $H_2O$, it was possible to carry out gas-liquid separation normally at all orientations.

Second Embodiment

Figure 6:
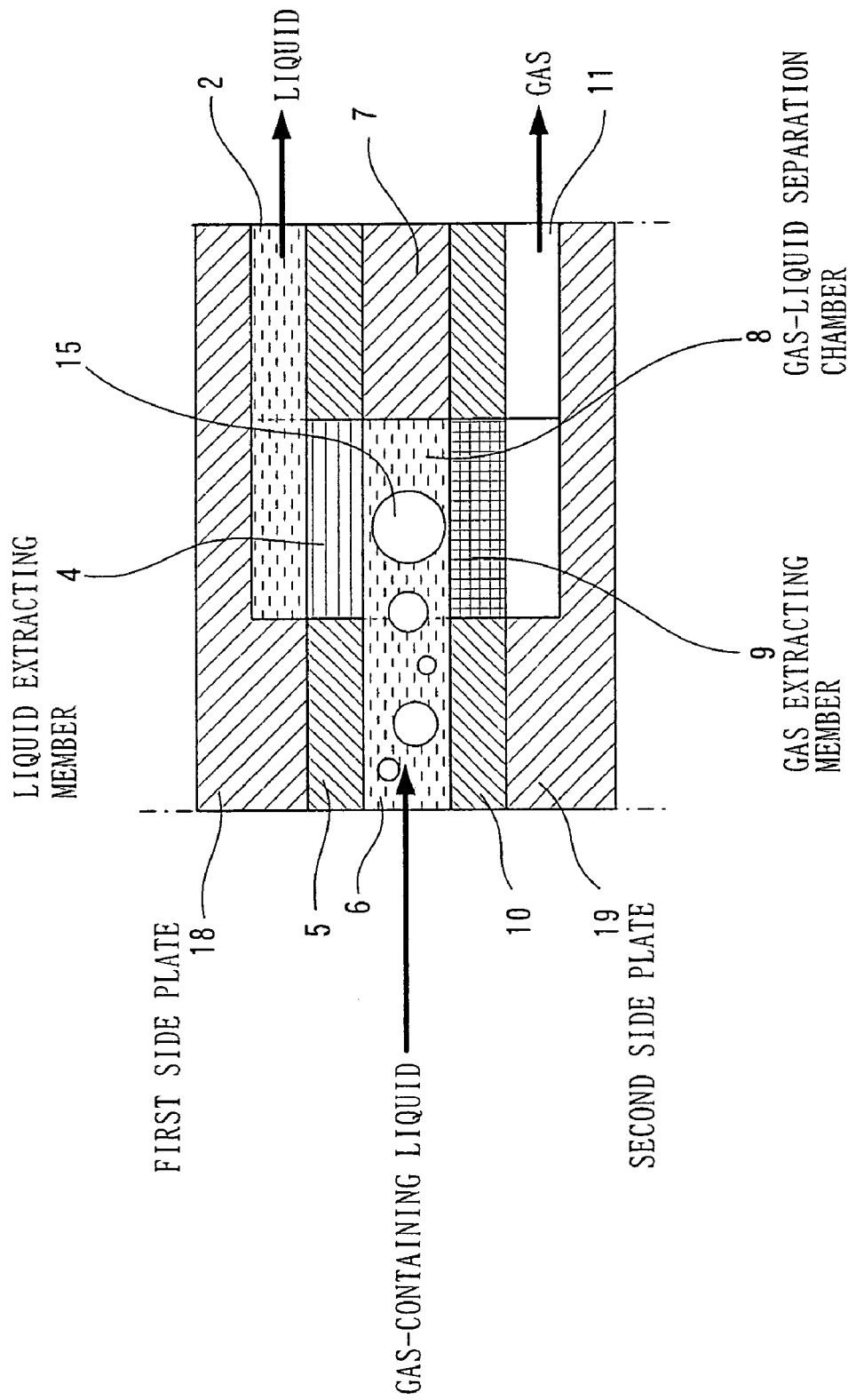
FIG. 6 is a sectional view of a gas-liquid separator according to a second embodiment of the present invention.
Figure 7:
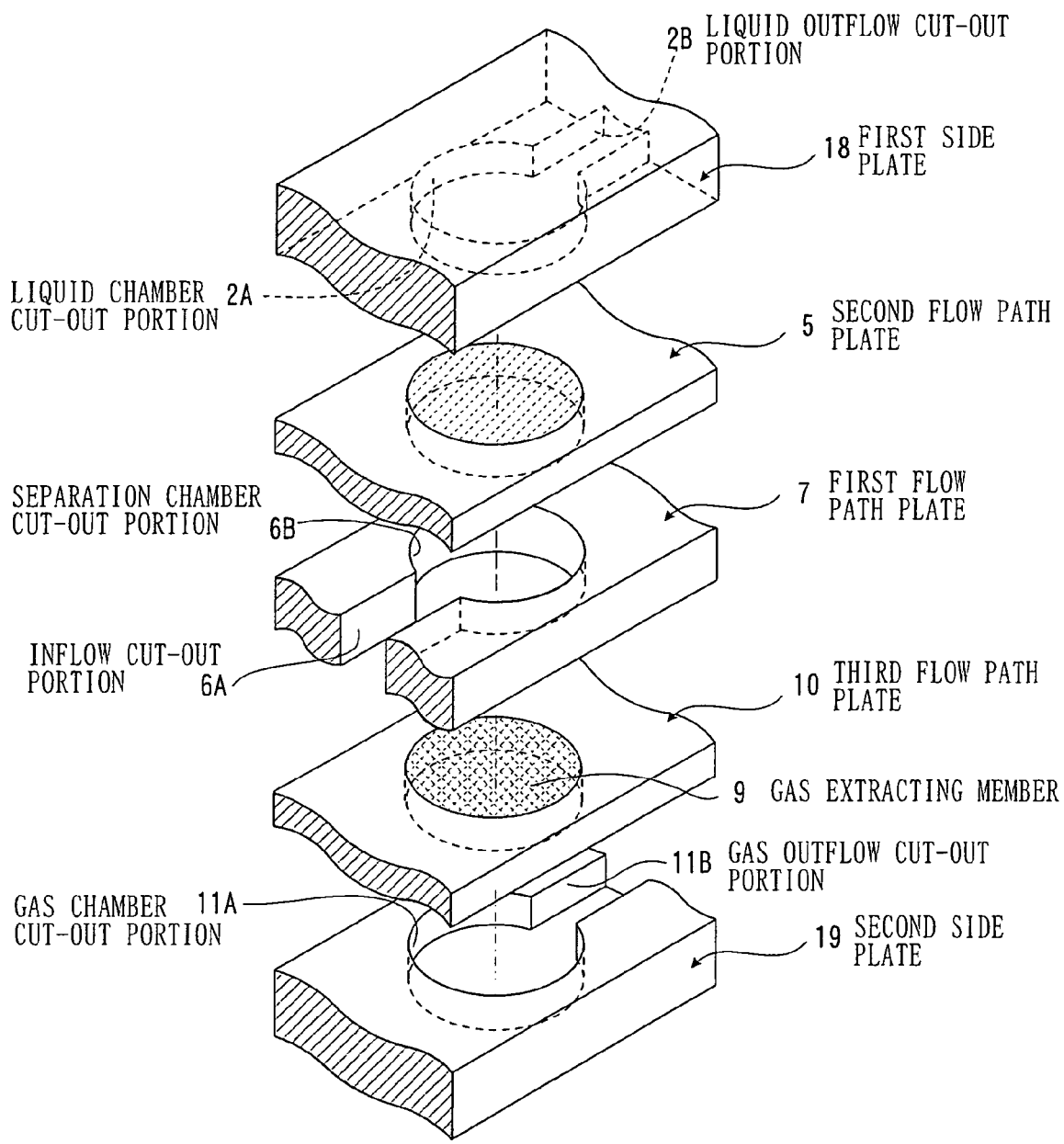
FIG. 7 is an exploded perspective view of the second embodiment.

FIGS. 6 and 7 show a gas-liquid separator of a second embodiment of the present invention.

With the first embodiment shown in FIG. 1, one of the openings of the liquid chamber cut-out portion 2A and the liquid outflow cut-out portion 2B formed in the fourth flow path plate 3 was closed off by the fifth flow path plate 1, which was a separate member, but in the present second embodiment, a first side plate 18 in which the fourth flow path plate 3 and the fifth flow path plate 1 are formed integrally with one another is used.

Specifically, the first side plate 18 has a constitution in which a recessed portion corresponding to the liquid chamber cut-out portion 2A and the liquid outflow cut-out portion 2B is formed in the surface of the first side plate 18 that adjoins the second flow path plate 5.

Moreover, with the first embodiment shown in FIG. 1, one of the openings of the gas chamber cut-out portion 11A and the gas outflow cut-out portion 11B formed in the sixth flow path plate 12 was closed off by the seventh flow path plate 13, which was a separate member, but in the present second embodiment, a second side plate 19 in which the sixth flow path plate 12 and the seventh flow path plate 13 are formed integrally with one another is used. Specifically, the second side plate 19 has a constitution in which a recessed portion corresponding to the gas chamber cut-out portion 11A and the gas outflow cut-out portion 11B is formed in the surface of the second side plate 19 that adjoins the third flow path plate 10. Otherwise the second embodiment is as with the first embodiment.

Third Embodiment

Figure 8:
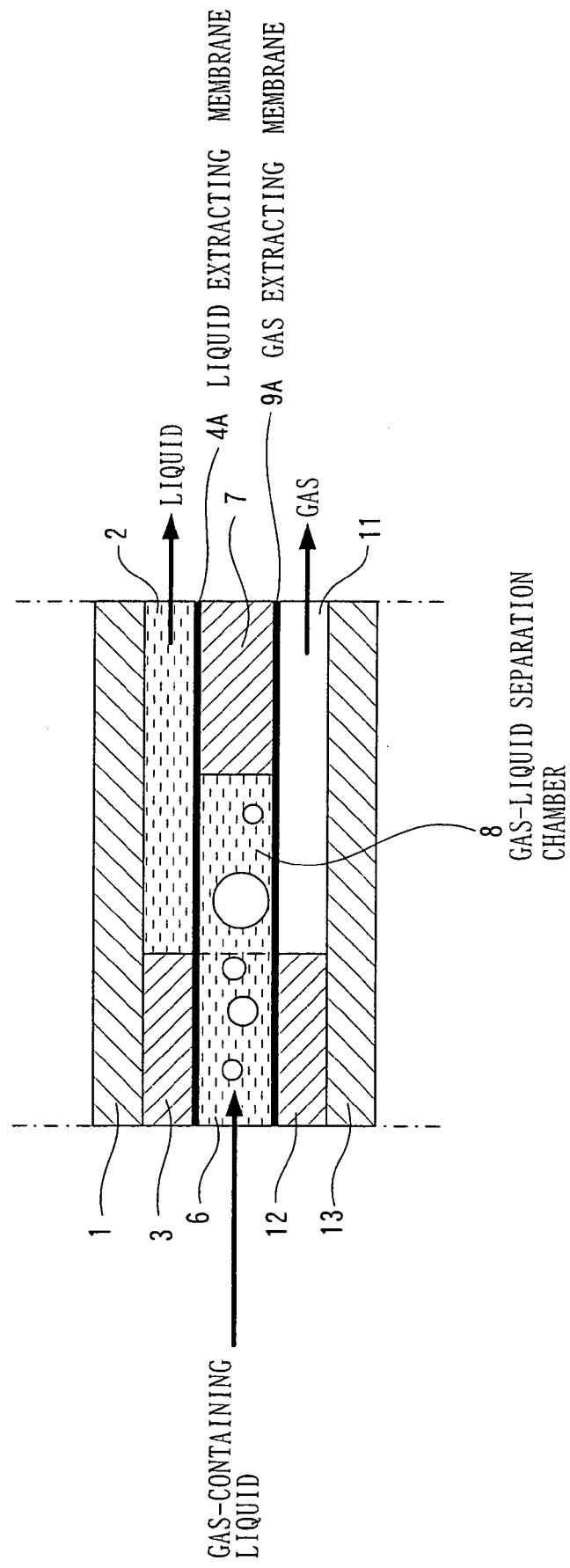
FIG. 8 is a sectional view of a gas-liquid separator according to a third embodiment of the present invention.
Figure 9:
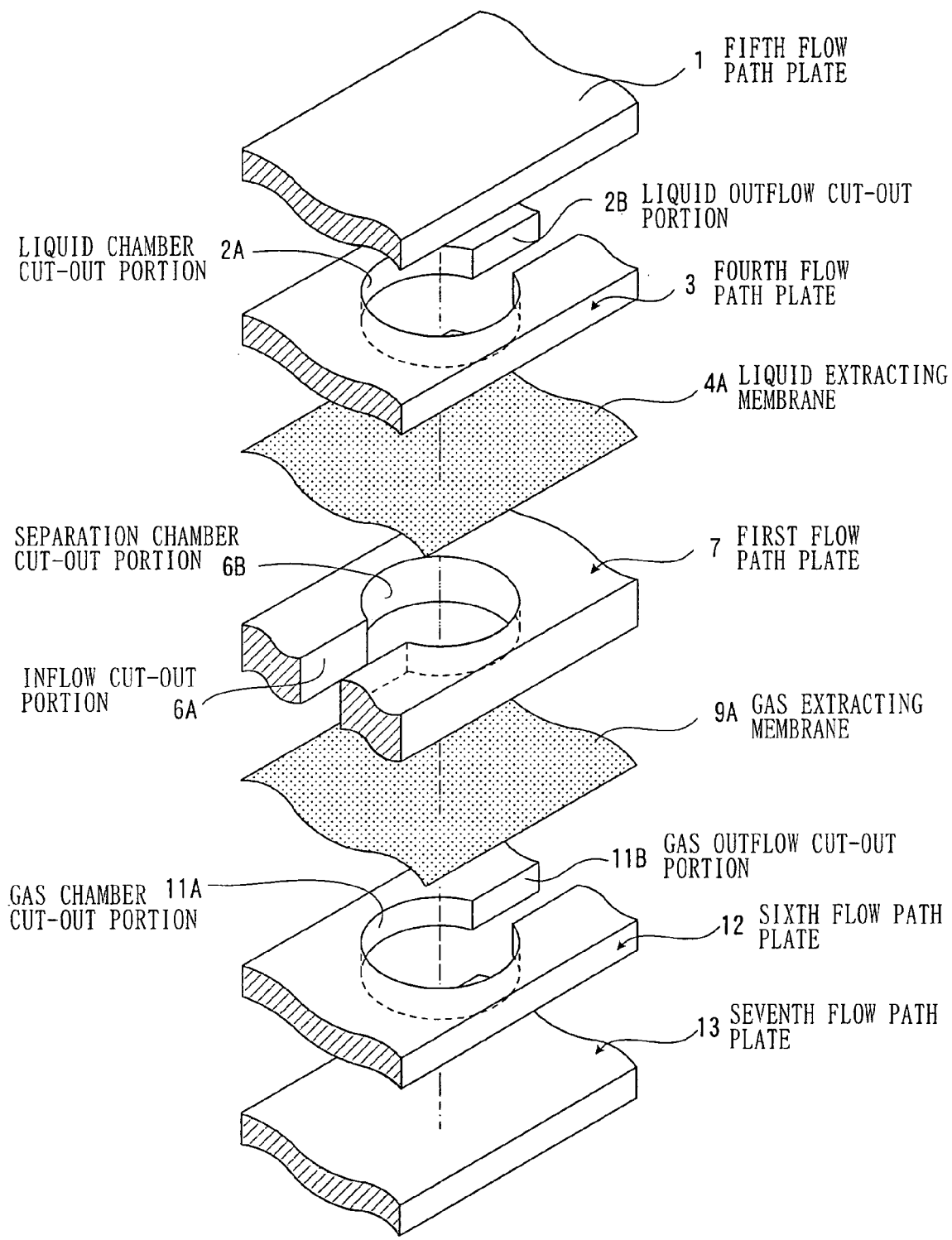
FIG. 9 is an exploded perspective view of the third embodiment.

FIGS. 8 and 9 show a gas-liquid separator of a third embodiment of the present invention.

With the first embodiment shown in FIG. 1, the second flow path plate 5 was provided between the first flow path plate 7 and the fourth flow path plate 3, but in the present third embodiment, a liquid extracting membrane 4A that has a size such as to cover the opening of the separation chamber cut-out portion 6B in the first flow path plate 7 and allows the passage of the liquid therethrough but restricts the passage of the gas therethrough is sandwiched between the first flow path plate 7 and the fourth flow path plate 3, and the opening on one side of the inflow cut-out portion 6A in the first flow path plate 7 is closed off by the fourth flow path plate 3 via the liquid extracting membrane 4A. Moreover, the opening on one side of the liquid outflow cut-out portion 2B in the fourth flow path plate 3 is closed off by the first flow path plate 7 via the liquid extracting membrane 4A.

Note that seeping out of the liquid in the case that the liquid extracting membrane 4A is provided between the first flow path plate 7 and the fourth flow path plate 3 can be eliminated by using a porous membrane material that has been two-dimensionally processed such that pores only pass through the liquid extracting membrane 4A in the thickness direction. Such two-dimensional pores can be realized using a conventional method such as direct processing using radiation and etching processing of a photosensitive fluororesin or a photosensitive polyimide resin. Moreover, in the case of using a material having three-dimensional pores as the liquid extracting membrane 4A, by inserting an acrylic resin sheet having the same projected shape as the flow path plates 3 and 7 and a thickness of approximately 20 µm or less between the flow path plate 3 and the liquid extracting membrane 4A and between the flow path plate 7 and the liquid extracting membrane 4A, and compression bonding at a temperature of at least 100° C., sealed joining can be carried out and hence seeping out of the liquid can be prevented, without clogging occurring in the extraction region of the liquid extracting membrane 4A.

Moreover, with the first embodiment, the third flow path plate 10 was provided between the first flow path plate 7 and the sixth flow path plate 12, but in the present third embodiment, a gas extracting membrane 9A that has a size such as to cover the opening of the separation chamber cut-out portion 6B in the first flow path plate 7 and allows the passage of the gas therethrough but restricts the passage of the liquid therethrough is sandwiched between the first flow path plate 7 and the sixth flow path plate 12, and the other opening of the inflow cut-out portion 6A in the first flow path plate 7 is closed off by the sixth flow path plate 12 via the gas extracting membrane 9A. Moreover, the opening of the gas outflow cut-out portion 11B in the sixth flow path plate 12 is closed off by the first flow path plate 7 and the seventh flow path plate 13 via the gas extracting membrane 9A.

Note that leaking out of the gas in the case that the gas extracting membrane 9A is provided between the first flow path plate 7 and the sixth flow path plate 12 can be eliminated by using a porous membrane material that has been two-dimensionally processed such that pores of the gas extracting membrane 9A pass through only in the thickness direction. Such two-dimensional pores can be realized using a conventional method such as direct processing using radiation and etching processing of a photosensitive fluororesin or a photosensitive polyimide resin. Moreover, in the case of using a material having three-dimensional pores as the gas extracting membrane 9A, by inserting an acrylic resin sheet having the same projected shape as the flow path plates 3 and 7 and a thickness of approximately 20 μm or less between the flow path plate 12 and the gas extracting membrane 9A and between the flow path plate 7 and the gas extracting membrane 9A, and performing compression bonding at a temperature of not lower than 100° C., sealed joining can be carried out and hence seeping out of the air can be prevented, without clogging occurring in the extraction region of the gas extracting membrane 9A.

Fourth Embodiment

Figure 10:
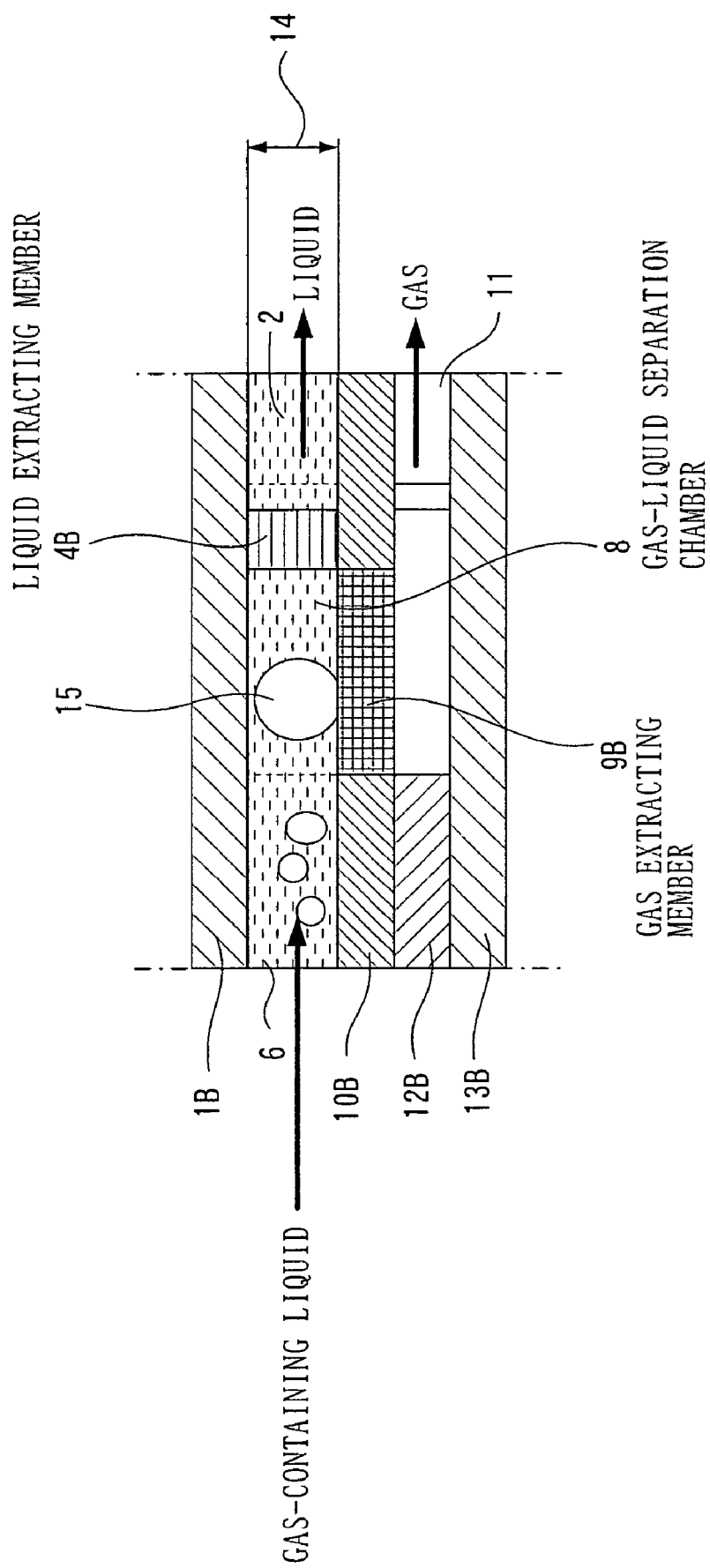
FIG. 10 is a sectional view of a gas-liquid separator according to a fourth embodiment of the present invention.

FIGS. 10 and 11 show a gas-liquid separator of a fourth embodiment of the present invention.

With the first embodiment shown in FIG. 1, the height of the gas-liquid separation chamber 8 was formed through the gap between the liquid extracting member 4 and the gas extracting member 9 which were disposed facing each other, and this height was set to be not more than the maximum bubble growth diameter in the direction of gravity, but in the present fourth embodiment, there is a difference in that the liquid extracting member 4B and the gas extracting member 9B that determine the height of the gas-liquid separation chamber 8 are disposed in mutually adjacent walls. As a result, two plates, i.e. the second flow path plate 5 and the fourth flow path plate 3, in FIG. 1 are not required.

Specifically, for the separation chamber that receives the gas-containing liquid, first and second separation chamber blocks 7A and 7B are bonded onto one surface of a first flow path plate 10B in which is installed a gas extracting member 9B that allows the passage of the gas therethrough but restricts the passage of the liquid therethrough, an inflow cut-out portion 6A, a separation chamber cut-out portion 6B and a liquid outflow cut-out portion 6C are formed between the first and second separation chamber blocks 7A and 7B, and the liquid extracting member 4B is installed in the separation chamber cut-out portion 6B. Openings of the inflow cut-out portion 6A, the separation chamber cut-out portion 6B and the liquid outflow cut-out portion 6C are closed off by a second flow path plate 1B being made to adjoin thereto.

A third flow path plate 12B having formed therein a gas chamber cut-out portion 11C and a gas outflow cut-out portion 11D that communicates with the gas chamber cut-out portion 11C, and a fourth flow path plate 13B that adjoins the third flow path plate 12B and closes off an opening of the gas chamber cut-out portion 11C and the gas outflow cut-out portion 11D are laminated onto the other surface of the first flow path plate 10B.

In the fourth embodiment, the liquid extracting member 4B is provided in contact with the first flow path plate 10B and the second flow path plate 1B, and the thickness of the first and second separation chamber blocks 7A and 7B is set such that the height 14 of the gas-liquid separation chamber 8 is not more than the maximum bubble growth diameter in the direction of gravity.

Through adopting such a constitution, the gas extracting member 9B is provided in one specific wall out of the walls facing onto the gas-liquid separation chamber, and the liquid extracting member 4B is disposed perpendicularly in a wall adjacent to this specific wall, and thus even if the gas-liquid separator is turned on its side or upside down, for the gas-containing liquid that has flowed into the gas-liquid separation chamber 8 from the inflow cut-out portion 6A, bubbles will come into contact with the gas extracting member 9B before reaching the maximum growth diameter, and hence the gas will be discharged into the gas outflow cut-out portion 11D; the gas-liquid separating ability can thus be maintained without the liquid extracting member 4B being covered with bubbles.

Furthermore, the number of flow path plates is lower than with the first embodiment of the present invention, and hence the gas-liquid separator can be made smaller and thinner.

Note that in the present fourth embodiment, the area of the liquid extracting member 4B is smaller than that of the gas extracting member 9B, and hence this embodiment is suitable for the case that the proportion of the liquid in the gas-liquid mixed fluid is low compared with that of the gas. In the case that the proportion of the gas in the gas-liquid mixed fluid is low compared with that of the liquid, the positions of the gas extracting member 9B and the liquid extracting member 4B in FIG. 10 may be swapped.

Moreover, in the present fourth embodiment, the first and second separation chamber blocks 7A and 7B and the second flow path plate 1B were constituted as separate components, but the first and second separation chamber blocks 7A and 7B and the second flow path plate 1B can be formed integrally with one another, thus reducing the number of components. Similarly, the third flow path plate 12B and the fourth flow path plate 13B can be formed integrally with one another, thus reducing the number of components.

Verificatory experiments were carried out using as the gas extracting member 9B PTFE (substrate contact angle 108°) having a pore diameter of 1 μm and an opening ratio of approximately 80% stuck to an SUS reinforcing plate having 100 μm pores formed therein, and on the other hand using as the liquid extracting member 4B PTFE that had been subjected to hydrophilic treatment (substrate contact angle not more than 10°) having a pore diameter of 3 μm and an opening ratio of approximately 80% again stuck to an SUS reinforcing plate having 100 μm pores formed therein.

As a result, in the case where the gap between the gas extracting member 9B and the second flow path plate 1B was made to be not more than the maximum bubble growth diameter in the direction of gravity, it was possible to carry out gas-liquid separation normally at all orientations, with a gas-liquid mixed fluid pressure of at least approximately 200 mm $H_2O$, for both pure water and a 10 wt % methanol aqueous solution.

Note that the maximum bubble height 16 in the direction of gravity in this case is, specifically, approximately 6 mm in the case of pure water at 74 mN/m, and approximately 3 mm in the case of methanol, ethanol or acetone at approximately 22 mN/m, and hence when receiving a gas-containing liquid comprising water and a gas and carrying out gas-liquid separation into the gas and the liquid, good results were obtained at a height 14 of the gas-liquid separation chamber 8 of not more than 6 mm. In the case of receiving a gas-containing liquid comprising a methanol aqueous solution and a gas and carrying out gas-liquid separation into the gas and the liquid, good results were obtained at a height 14 of the gas-liquid separation chamber 8 of not more than 3 mm.

In each of the embodiments above, there are at least three inflow/outflow paths, i.e. an inflow path through which the mixed liquid flows in, a liquid outflow path through which the separated and extracted liquid is discharged, and a gas outflow path through which the separated and extracted gas is discharged, and one of each inlet/outlet is provided, but a plurality of each may be provided. Moreover, the gas outflow path and liquid outflow path positions can be set freely.

Fifth Embodiment

Next, a gas-liquid separator of the present invention and a fuel cell equipped with the gas-liquid separator will be described in detail through a fifth embodiment below.

Figure 12:
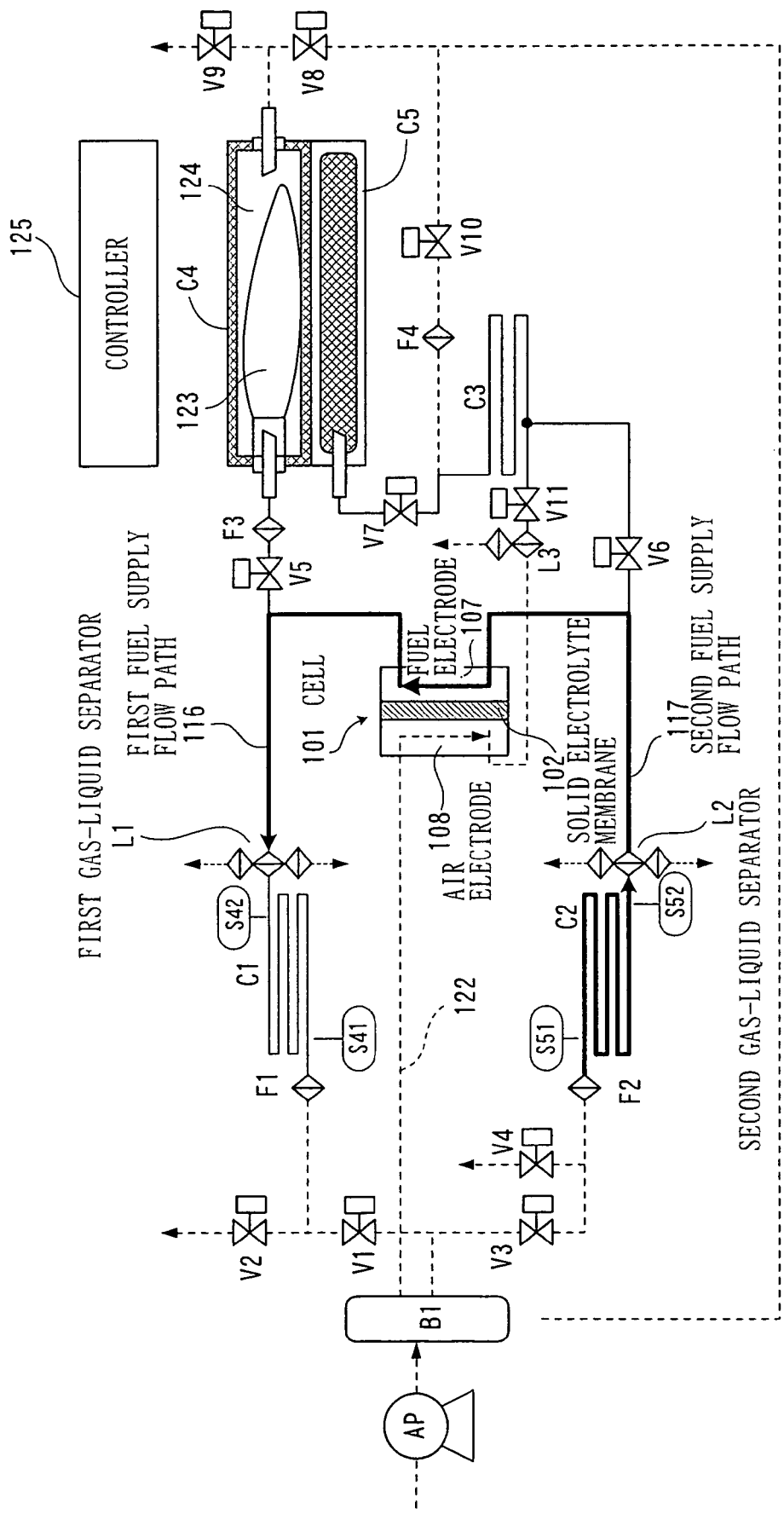
FIG. 12 is a schematic diagram showing the constitution of a fuel cell according to the fifth embodiment of the present invention.

In FIG. 12, the fuel cell of the fifth embodiment is constituted from a combination of a cell 101, first and second fuel tanks C1 and C2, a single air pump AP, a buffer tank B1, a water storage tank C3, a methanol storage vessel C4, pipelines connecting therebetween, and valves, gas-liquid separators L1 and L2 and so on connected in the pipelines.

Figure 20:
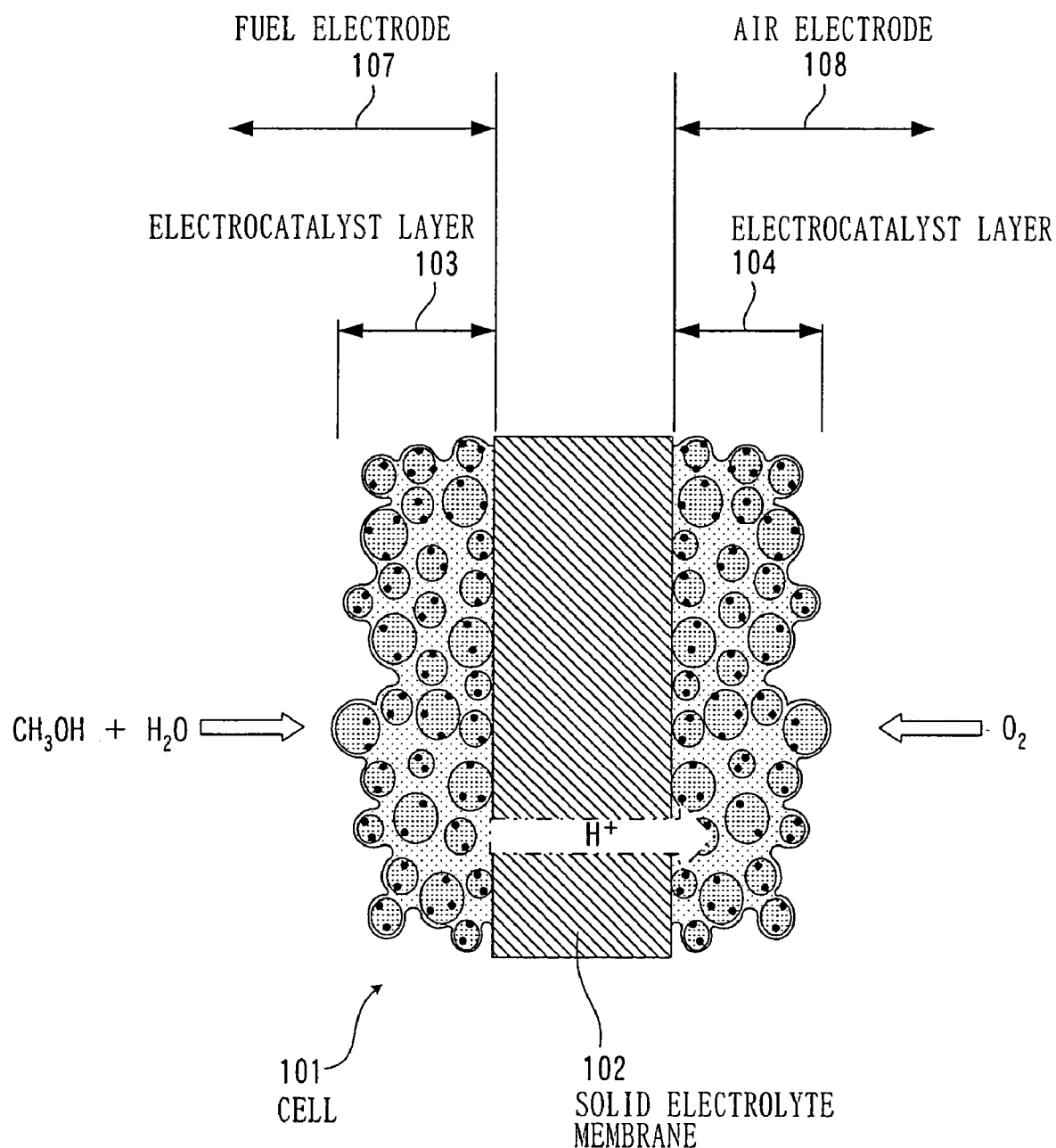
FIG. 20 is an enlarged sectional view of a cell for explaining an electricity generating system of the fuel cell.

As shown in FIGS. 12 and 20, the cell 101 has a constitution in which a solid electrolyte membrane 102 is disposed in the center, and on the two surfaces thereof are formed a fuel electrode 107 having an electrocatalyst layer 103, and an air electrode 108 having an electrocatalyst layer 104. Moreover, the first and second fuel tanks C1 and C2 are disposed on either side of the fuel electrode 107 of the cell 101 which is in the center, and the first fuel tank C1 and the fuel electrode 107 are connected together by a first fuel supply flow path 116, while the second fuel tank C2 and the fuel electrode 107 are connected together by a second fuel supply flow path 117.

Figure 13:
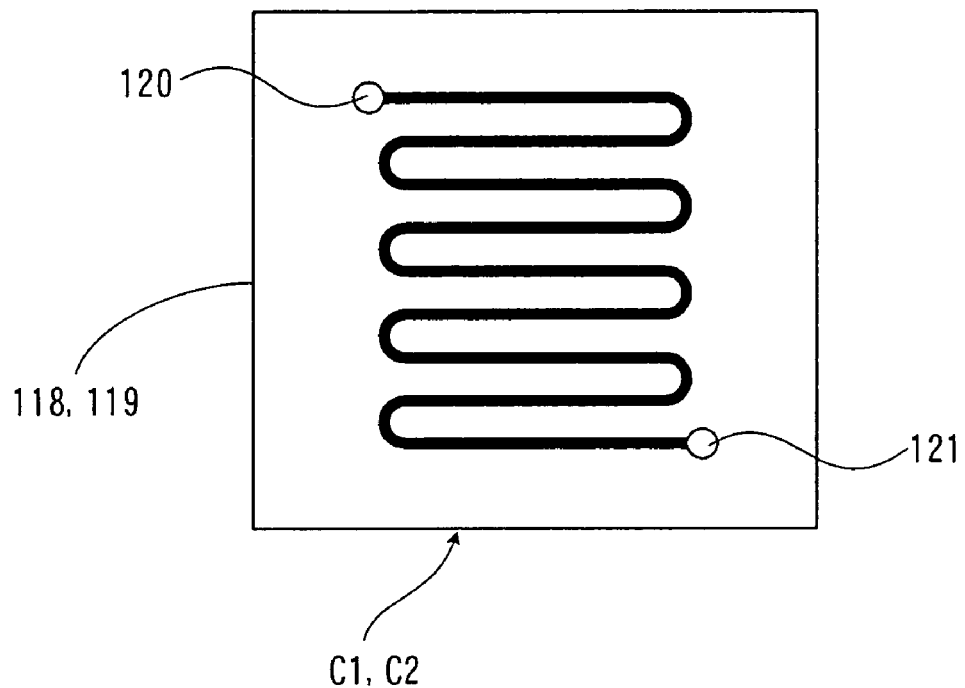
FIG. 13 is a plan view of a first or second fuel tank of the fuel cell.

Here, as shown in FIG. 13, the first and second fuel tanks C1 and C2 are each constituted as a narrow (diameter approximately 3 mm) meandering serpentine-type fuel tank. For example, the first and second fuel tanks C1 and C2 are each formed by bonding together a first glass substrate 118 having formed therein a recessed portion that forms part of the meandering path, and a second glass substrate 119 having formed therein a recessed portion that forms part of the meandering path with the face thereof being symmetrical with that of the recessed portion of the first glass substrate 118, such that the respective recessed portions are on the inside. 120 in FIG. 13 is an air inlet, and 121 is a liquid inlet/outlet.

A fuel inlet/outlet of the first fuel tank C1 (hereinafter referred to as 'section S42') has installed therein the first gas-liquid separator L1, and a fuel inlet/outlet of the second fuel tank C2 (hereinafter referred to as 'section S52') has installed therein the second gas-liquid separator L2.

Figure 15:
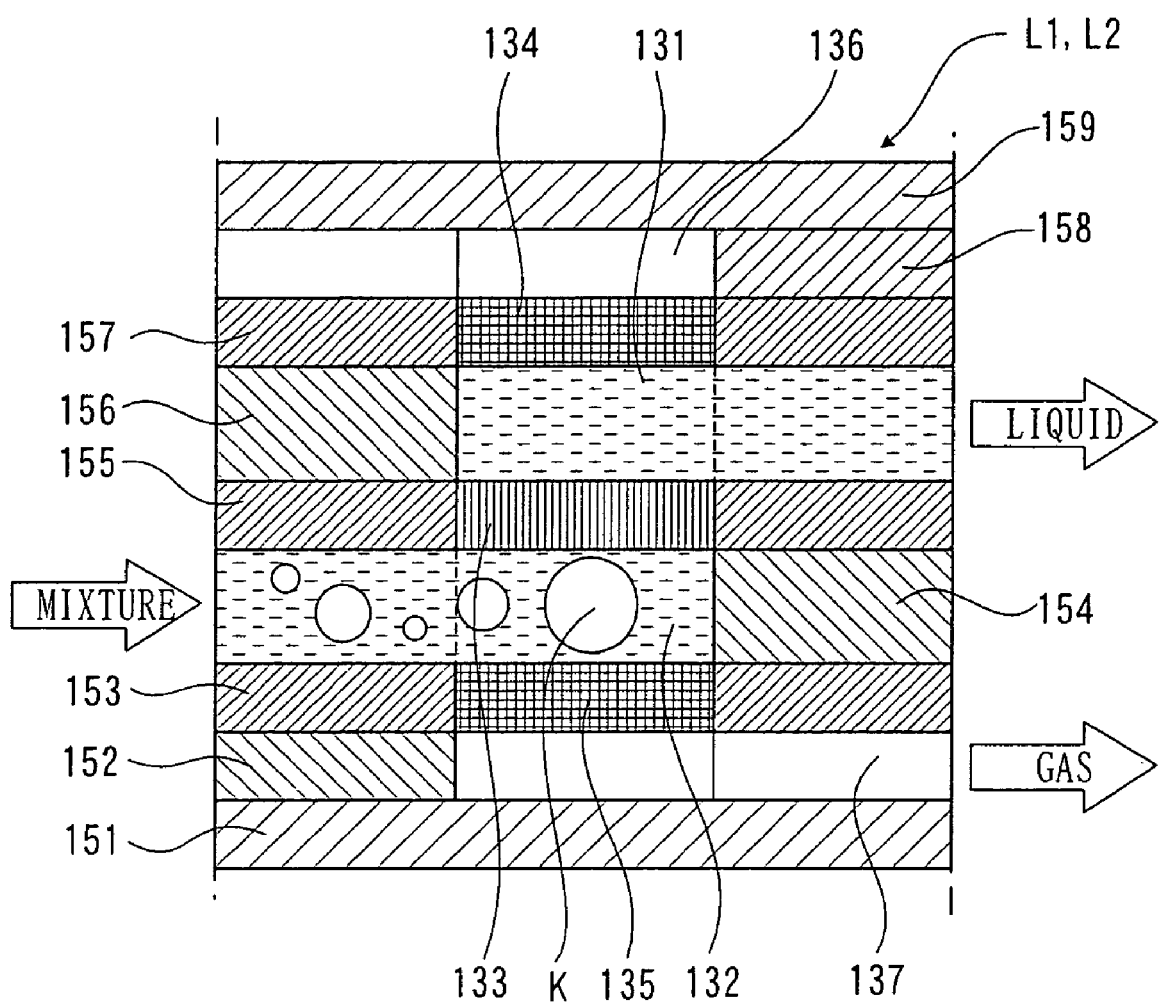
FIG. 15 is a sectional view showing a state where a gas-containing liquid has flowed from a fuel tank side into a gas-liquid separator according to the fifth embodiment of the present invention.
Figure 16:
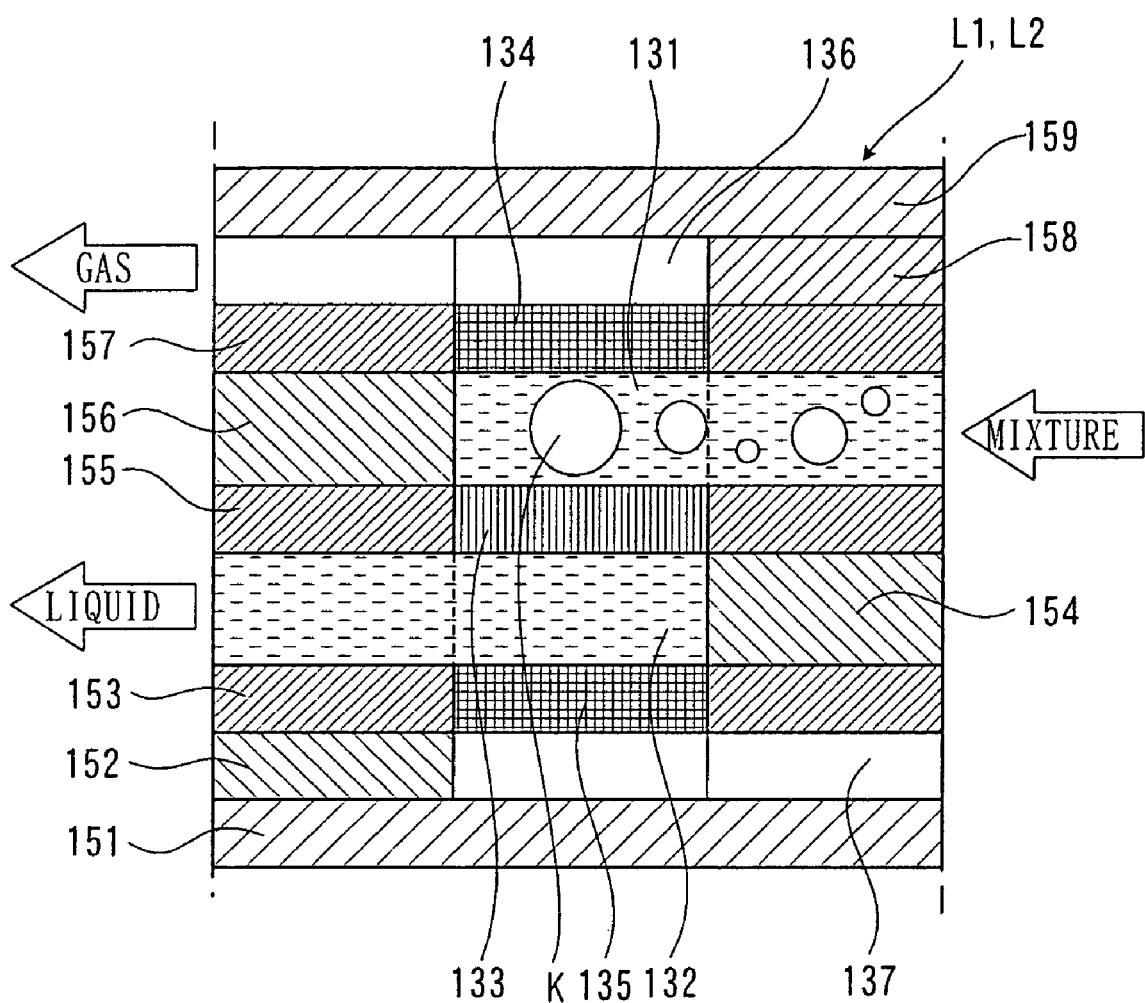
FIG. 16 is a sectional view showing a state where a gas-containing liquid has flowed from a fuel supply flow path side into the gas-liquid separator.
Figure 17:
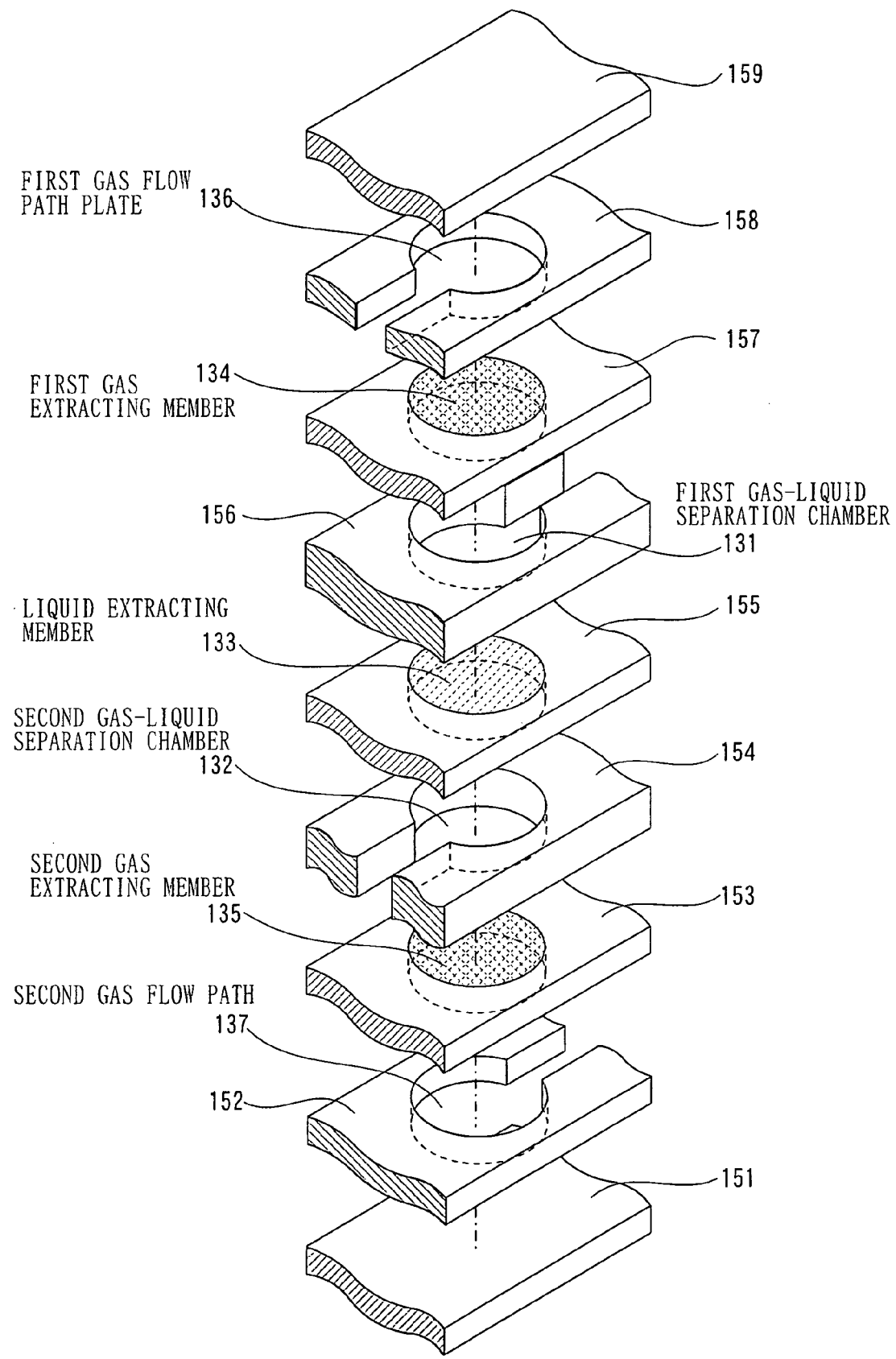
FIG. 17 is an exploded perspective view of the gas-liquid separator.

As shown in FIGS. 15 to 17, the first and second gas-liquid separators L1 and L2 are each constituted from a plurality of (nine in the case shown in FIGS. 15 to 17) flow path plates 151 to 159 laminated together. These flow path plates 151 to 159 have provided therein a first gas-liquid separation chamber 131 to which is connected the first or second fuel supply flow path 116 or 117, a second gas-liquid separation chamber 132 to which is connected the first or second fuel tank C1 or C2, a liquid extracting member 133 that is provided between the first gas-liquid separation chamber 131 and the second gas-liquid separation chamber 132 and comprises a hydrophilic material (specifically a hydrophilic porous material) that allows the passage of a liquid such as a methanol aqueous solution therethrough but restricts the passage of a gas such as carbon dioxide gas therethrough, a first gas extracting member 134 that is provided facing onto the first gas-liquid separation chamber 131 and comprises a hydrophobic material (specifically a hydrophobic porous material) that allows the passage of a gas such as carbon dioxide gas into a first gas flow path 136 but restricts the passage of a liquid such as a methanol aqueous solution, and a second gas extracting member 135 that is provided facing onto the second gas-liquid separation chamber 132 and comprises a hydrophobic material (specifically a hydrophobic porous material) that allows the passage of a gas such as carbon dioxide gas into a second gas flow path 137 but restricts the passage of a liquid such as a methanol aqueous solution. Here, the heights of the first and second gas-liquid separation chambers 131 and 132 that face onto the first and second gas extracting members 134 and 135 respectively (the thicknesses of the flow path plates 154 and 156 in which the first and second gas-liquid separation chambers 131 and 132 are formed, i.e. cut out, in the case of FIGS. 15 to 17) are set to be not more than the maximum bubble growth diameter in the direction of gravity which depends on the surface tension of the liquid such as the methanol aqueous solution. Note that 'K' in FIGS. 15 and 16 represents a bubble.

Moreover, an air inlet/outlet of the first fuel tank C1 shown in FIG. 12 (hereinafter referred to as 'section S41') has installed therein a first filter F1 which is a hydrophobic porous membrane, and an air inlet/outlet of the second fuel tank C2 (hereinafter referred to as 'section S51') has installed therein a second filter F2 which is a hydrophobic porous membrane.

Regarding an air supply flow path that supplies air to the air electrode 108 of the cell 101, one end of the air electrode 108 and the buffer tank B1 are connected together by a pipeline 122, and the other end of the air electrode 108 is connected to one end of the water storage tank C3 via a third gas-liquid separator L3 and a valve V11. Note that the third gas-liquid separator L3 only has a function of separating out air from the fluid on the air electrode 108 side and feeding only water to the water storage tank C3 side. The one end of the water storage tank C3 is connected to the second fuel supply flow path 117 via a valve V6. As with the first and second fuel tanks C1 and C2, the water storage tank C3 is also constituted as a narrow (diameter not more than 3 mm) meandering serpentine-type tank.

The buffer tank B1, which is pressurized by the air pump AP such that the internal pressure is maintained at a target value, is connected to the air inlet/outlet of the first fuel tank C1 via a valve V1 and the first filter F1, and is connected to the air inlet/outlet of the second fuel tank C2 via a valve V3 and the second filter F2. Moreover, the connection point between the valve V1 and the first filter F1 is connected to the atmosphere via a valve V2. The connection point between the valve V3 and the second filter F2 is connected to the atmosphere via a valve V4.

The methanol storage vessel C4 has formed therein a hermetically sealed chamber 124 that houses a flexible bag 123 charged with high-concentration methanol, and the hermetically sealed chamber 124 is connected to the buffer tank B1 via a valve V8. Moreover, the hermetically sealed chamber 124 can be opened to the atmosphere via a valve V9. A fuel outlet of the bag 123 is connected to the first fuel supply flow path 116 via a filter F3 for preventing contamination with foreign matter and a valve V5. The methanol storage vessel C4 also has provided therein a surplus water tank C5.

The surplus water tank C5 is connected to the other end of the water storage tank C3 via a valve V7. Moreover, this other end of the water storage tank C3 is also connected to the buffer tank B1 via a fourth filter F4 which is a hydrophobic porous membrane and a valve V10.

Figure 14:
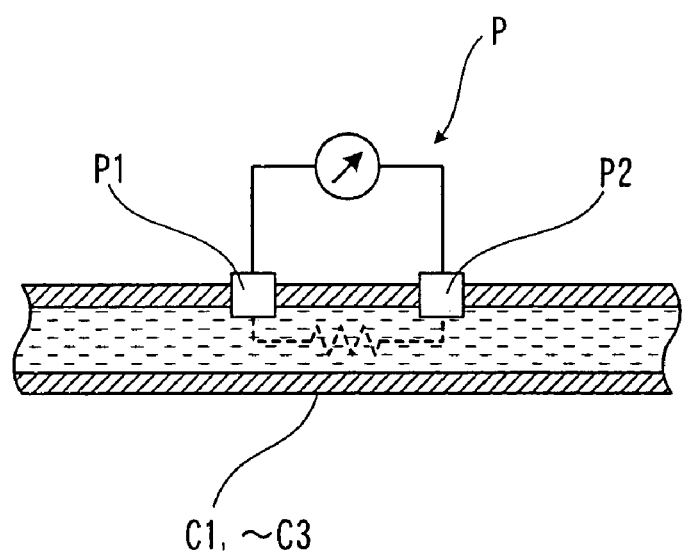
FIG. 14 is an enlarged sectional view of essential parts of the fuel tank.

Furthermore, the section S42 (the fuel inlet/outlet of the first fuel tank C1), the section S52 (the fuel inlet/outlet of the second fuel tank C2), the section S41 (the air inlet/outlet of the first fuel tank C1), and the section S51 (the air inlet/outlet of the second fuel tank C2) each have installed therein electrodes P1 and P2 as first and second sensors P that detect the amount of liquid fuel in the first or second fuel tank C1 or C2 as shown in FIG. 14, and it is determined whether or not there is methanol aqueous solution in each of the sections S41, S42, S51 and S52 based on the electrical resistance value for when methanol aqueous solution is present between the electrodes P1 and P2, and the electrical resistance value for when methanol aqueous solution is no longer present therebetween.

Note that each of the tanks C1, C2 and C3 is constituted using a liquid-repellent material on a flow path pipe or subjecting the inside of the flow path to liquid-repellent treatment. If the wettability of the flow path wall is high, then a water film will remain on the wall, and hence the fuel transfer efficiency will become poor; the purpose of the above is to ameliorate this. More specifically, a fluorine-based pipe material is used for the tanks C1, C2 and C3 or else the inside of the flow path is subjected to fluorine-based liquid-repellent treatment, whereby the fuel transfer is smooth and the transfer efficiency is good, with a water film or droplets not remaining on the flow path partitioning walls, and liquid surface detection can be carried out clearly.

As each of the valves V1 to V11, an electromagnetic valve for which the state can be switched between open and closed electrically in accordance with the operational state is used, and in particular, a latching type electromagnetic valve, for which when a set pulse voltage is applied at an open/closed state switchover timing, the flow path is then self-held in an open state after the set pulse voltage ceases until the timing of a reset pulse voltage subsequently being applied, and when a reset pulse voltage is applied, the flow path is then self-held in a closed state after the reset pulse voltage ceases until the timing of a set pulse voltage subsequently being applied, is preferable in terms of reducing the power consumption; in FIG. 12, such set pulse voltages and reset pulse voltages are applied to the valves V1 to V11 from a controller 125 in accordance with the operational state. Note that the controller 125 is equipped with an exclusive startup battery for operating the valves V1 to V11 and so on upon startup.

A detailed description will now be given based on the various operational states 'during shutdown', 'startup', 'supplying in of methanol aqueous solution', 'injecting in of methanol', 'supplying in of water' and 'timing for supplying in of fuel or water'.

During Shutdown

The valves V1 to V11 are all set to the closed state, and there is methanol aqueous solution in the second fuel tank C2, but the first fuel tank C1 is in an empty state. Furthermore, the fuel electrode 107 of the cell 101 and the first and second fuel supply flow paths 116 and 117 are full of fuel. The water storage tank C3 has therein diluting water or water that has been produced at the air electrode 108.

Startup

The air pump AP is turned on, whereupon air is fed to the air electrode 108 of the cell 101 via the buffer tank B1. Due to the flow path resistance of the flow path of the air electrode 108 and so on, the pressure in the buffer tank B1 rises to several kPa and stabilizes, resulting in a standby state. Supplying in of methanol aqueous solution a. Waiting Stage In a waiting stage of the supplying in of the methanol aqueous solution, the valves V1 and V3 are set to a closed state and the valves V2 and V4 are set to a closed state by the controller 125.

At this time, the controller 125 checks that the first fuel tank C1 is in an empty state and the second fuel tank C2 is in a full state from the electrical conductivity between the electrodes P1 and P2 in the sections S41, S42, S51 and S52. Specifically, it is checked whether or not the methanol level in the sections S41 and S42 at the two ends of the first fuel tank C1 is in a state such that methanol cannot be detected (hereinafter this state with no methanol is referred to as 'low'), and the methanol level in the sections S51 and S52 at the two ends of the second fuel tank C2 is in a state such that methanol is detected (hereinafter this state with methanol is referred to as 'hi').

In the case that the first fuel tank C1 is not in the empty state and the second fuel tank C2 is not in the full state, the controller 125 puts the valves V2 and V3 into a closed state and the valves V1 and V4 into an open state, whereby pressurized air is fed from the buffer tank B1 into the first fuel tank C1 via the valve V1 and the filter F1, methanol aqueous solution remaining in the first fuel tank C1 is transferred through the first fuel supply flow path 116, the fuel electrode 107, the second fuel supply flow path 117 and the gas-liquid separator L2 into the second fuel tank C2, and air pushed out from the second fuel tank C2 is released into the atmosphere from the filter F2 via the valve V4.

Note that in the case that the second fuel tank C2 is not in the full state at the end of the waiting stage, it is judged that there is a lack of methanol aqueous solution, and upon detecting this the controller 125 instructs high-concentration methanol to be injected into the first fuel supply flow path 116, and moreover carries out control such that water is injected into the second fuel supply flow path 117.

Once the first fuel tank C1 has come to be in the empty state and the second fuel tank C2 has come to be in the full state in this way, the controller 125 executes the following first operational stage.

b. First Operational Stage

In this state, the valves V1 and V4 are set to a closed state, and the valves V2 and V3 are set to an open state, whereby a state is produced in which pressurized air can be fed from the buffer tank B1 into the second fuel tank C2 via the valve V3 and the filter F2, and moreover air inside the first fuel tank C1 can be released into the atmosphere via the filter F1 and the valve V2. As a result, the methanol aqueous solution in the second fuel tank C2 is pushed out into the second fuel supply flow path 117 via the gas-liquid separator L2 by the pressure of the pressurized air. The methanol aqueous solution that has been pushed out into the second fuel supply flow path 117 passes through the fuel electrode 107, and upon passing through the fuel electrode 107 methanol and water are consumed, and carbon dioxide gas is produced; the methanol aqueous solution that has thus become a gas-liquid mixed fluid passes through the first fuel supply flow path 116, and is subjected to gas-liquid separation in the gas-liquid separator L1, with the carbon dioxide gas in the gas-liquid mixed fluid being separated out by the gas-liquid separator L1 and discharged into the atmosphere. Only the methanol aqueous solution remaining from the gas-liquid separation thus flows into the first fuel tank C1 via the gas-liquid separator L1.

In this case, in the fuel tanks C1 and C2, the gas such as carbon dioxide gas dissolves in the methanol aqueous solution, albeit only slightly. Consequently, when the methanol aqueous solution is fed out from the second fuel tank C2, the gas such as carbon dioxide gas may appear as bubbles. However, as shown in FIG. 15, in the gas-liquid separator L2, even in the case that gas has become mixed into the liquid fed in from the second fuel tank C2, bubbles K that have collected in the second gas-liquid separation chamber 132 grow and when the bubbles K come into contact with the second gas extracting member 135, the bubbles K pass through the second gas extracting member 135 and are discharged into the second gas flow path 137. As a result, the bubbles K are prevented from collecting at places such as the section S52 in the second fuel tank C2, and hence there can be prevented a situation in which, even though methanol aqueous solution remains in the second fuel tank C2, bubbles K in the section S52 are detected by the sensor, and thus it is mistakenly judged that there is no longer any methanol aqueous solution in the second fuel tank C2. Moreover, the methanol aqueous solution in the second fuel tank C2 will not stagnate in the gas-liquid separator L2, and hence can be fed to the fuel electrode 107 via the second fuel supply flow path 117 well.

Moreover, the methanol aqueous solution at the fuel electrode 107 which contains carbon dioxide gas and has thus become a gas-liquid mixed fluid passes through the first fuel supply flow path 116 and, as shown in FIG. 16, is introduced into the first gas-liquid separation chamber 131 of the gas-liquid separator L1, but passes through the first gas extracting member 134 and is discharged into the first gas flow path 136. Consequently, as described above, only the methanol aqueous solution from which the carbon dioxide gas has been removed flows into the first fuel tank C1 via the gas-liquid separator L1.

Moreover, due to the flow path constitution described above, a liquid surface boundary is formed in the flow path of the first fuel tank C1 into which the methanol aqueous solution has been fed, and this liquid surface passes through the section S42, and moves toward the section S41.

Upon detecting that the methanol aqueous solution has reached the section S41, the controller 125 switches over to the following second operational stage.

Note that in the case that at the end of the first operational stage the sections S41 and S42 of the first fuel tank C1 do not come to be at a 'hi' level even though the sections S51 and S52 of the second fuel tank C2 have come to be at a 'low' level, it is judged that a prescribed amount of methanol aqueous solution has been consumed, and upon detecting this the controller 125 instructs high-concentration methanol to be injected into the first fuel supply flow path 116, and moreover carries out control such that water is injected into the second fuel supply flow path 117.

c. Second Operational Stage

In the second operational stage, switchover is carried out to an operational stage in which the methanol aqueous solution is transferred from the first fuel tank C1 into the second fuel tank C2. Specifically, the valves V2 and V3 are set to a closed state, and the valves V1 and V4 are set to an open state, whereby a state is produced in which pressurized air can be fed from the buffer tank B1 into the first fuel tank C1 via the valve V1 and the filter F1, and moreover air inside the second fuel tank C2 can be released into the atmosphere via the filter F2 and the valve V4. As a result, the methanol aqueous solution stored in the first fuel tank C1 is pushed out into the first fuel supply flow path 116 after being subjected to gas-liquid separation by the gas-liquid separator L1, and is supplied to the fuel electrode 107. Methanol and water are consumed at the fuel electrode 107, and carbon dioxide gas is produced; the methanol aqueous solution that has thus become a gas-liquid mixed fluid passes through the second fuel supply flow path 117, and is subjected to gas-liquid separation in the gas-liquid separator L2, with the carbon dioxide gas in the gas-liquid mixed fluid being separated out by the gas-liquid separator L2 and discharged into the atmosphere. Only the methanol aqueous solution remaining from the gas-liquid separation thus flows into the second fuel tank C2 via the gas-liquid separator L2.

Note that in the case that at the end of the second operational stage the sections S51 and S52 of the second fuel tank C2 do not come to be at a 'hi' level even though the sections S41 and S42 of the first fuel tank C1 have come to be at a 'low' level, it is judged that a prescribed amount of methanol aqueous solution has been consumed, and upon detecting this the controller 125 instructs high-concentration methanol to be injected into the first fuel supply flow path 116, and moreover carries out control such that water is injected into the second fuel supply flow path 117.

Case of Injecting in High-Concentration Methanol

In a standby state in which high-concentration methanol is not injected in, the valves V8 and V5 are set to a closed state and the valve V9 is set to an open state and hence the state is at standby, but when high-concentration methanol is to be injected in, the valve V9 is switched over to a closed state and the valves V8 and V5 are switched over to an open state, whereby pressurized air is supplied from the buffer tank B1 into the hermetically sealed chamber 124 of the methanol storage vessel C4 via the valve V8. As a result, the bag 123 is squashed in accordance with the volume of pressurized air supplied in, and hence high-concentration methanol is injected from the bag 123 into the first fuel supply flow path 116 via the filter F3 and the valve V5. The injection in this case is carried out until the controller 125 detects whether or not the respective sections S41, S42, S51 and S52 have become full in the respective stages.

Case of Injecting in Water

During repeated operation of the first and second operational stages, water is stored in the water storage tank C3 as follows. That is, the valves V7 and V11 are set to an open state and the valves V10 and V6 are set to a closed state, whereby a mixed fluid of water and unreacted air that has passed through the air electrode 108 of the cell 101 is passed into the gas-liquid separator L3. As a result, the unreacted air is discharged into the atmosphere, and only the water passes through the liquid extracting member, which comprises a hydrophilic porous material, of the gas-liquid separator L3, and this water passes through the valve V11 and is stored in the water storage tank C3. Upon water being fed into the water storage tank C3, the liquid surface between gas and liquid in the water storage tank C3 moves toward the surplus water tank C5 as the amount of water increases. Specifically, the surplus water tank C5 is constituted from a porous material provided on the outside of the hermetically sealed chamber 124 of the methanol storage vessel C4, and surplus water exceeding the capacity of the water storage tank C3 is absorbed and held by the porous material of the surplus water tank C5, and is evaporated from this porous material into the atmosphere and thus discharged.

Injection of water from the water storage tank C3 into the second fuel supply flow path 117 is carried out as follows. In this case, with the valve V8 kept in a closed state, the valves V7 and V11 are switched to a closed state and the valves V6 and V10 are switched to an open state by the controller 125.

As a result, pressurized air is supplied from the buffer tank B1 into the water storage tank C3 via the valve V10 and the filter F4, and hence water stored in the water storage tank C3 is injected into the second fuel supply flow path 117 via the valve V6. The injection in this case is carried out until the controller 125 detects whether or not the respective sections S41, S42, S51 and S52 have become full in the respective stages. Once the injection is finished, the controller 125 returns the valves V7 and V11 to the open state and the valves V10 and V6 to the closed state.

The timings for the above 'case of injecting in high-concentration methanol' and 'case of injecting in water' are as follows. That is, when methanol and water are consumed at the fuel electrode 107, for example in the case that the fuel is conveyed to the second fuel tank C2 from the first fuel tank C1, a state arises in which the sections S51 and S52 do not become 'hi' even though the sections S41 and S42 have become 'low'. At this time, the controller 125 looks at the methanol concentration, and in the case that the concentration is determined to be low, injects in high-concentration methanol, and in the case that the concentration is determined to be high, injects in water.

Note that the methanol concentration is detected by directly reading out the output of a methanol concentration sensor (not shown in the drawings) provided in at least one of the first fuel supply flow path 116 and the second fuel supply flow path 117, or the methanol concentration is read out indirectly from the generated power of the cell 101.

In this way, the high-concentration methanol and the water injected into the first fuel supply flow path 116 and the second fuel supply flow path 117 are mixed together rapidly and uniformly through the repeated operation of the first operational stage and the second operational stage.

Note that the volume of each of the first fuel tank C1 and the second fuel tank C2 is preferably the same as or more than the flow path volume from the first fuel supply flow path 116 to the second fuel supply flow path 117 including the flow path of the fuel electrode 107 of the cell 101. This is because the fuel in the cell 101 is renewed in one direction.

For a fuel cell in which the supply of fuel to the fuel electrode 107 of the cell 101 is carried out in both directions through the repeated operation of the first operational stage and the second operational stage in this way, the current-voltage characteristic of the 101 was measured. The result was that no change in the current or voltage was detected at the timing of the switchover between the first operational stage and the second operational stage. It is thought that the change is not more than 1 mW.

Moreover, in the case of one direction a state will arise continuously in which the inlet of the fuel electrode of the cell 101 becomes gas-free and methanol-rich whereas at the outlet of the fuel electrode the amount of gas is high and the methanol concentration is low. Consequently, the power output will become high on the inlet side and low on the outlet side, and thus the lifetime of the air electrode on the inlet side will become short, and moreover the methanol concentration on the inlet side of the fuel electrode will always be high, and hence methanol crossover will occur and the output will no longer rise. In contrast with this, by making the supply of the fuel to the fuel electrode 107 of the cell 101 be in both direction as in the embodiment described above, the MEA (MEA=membrane electrode assembly) membrane output is averaged, and the MEA load is also averaged. Moreover, the methanol concentration at each of the inlet and outlet alternates between low and high, and hence methanol crossover is reduced.

As a result, the output increases. Regarding the discharge of bubbles as well, if the flow is in one direction then bubbles will become relatively prone to collecting in the electrocatalyst layer of the fuel electrode, and hence the ability to discharge bubbles from the outlet of the fuel electrode will drop; however, if the flow is in both directions, then because the direction of inflow changes, it becomes that bubbles readily break away from the electrocatalyst layer of the fuel electrode, and hence the amount of bubbles at the outlet of the fuel electrode increases. Moreover, even in the case that the ability to discharge the bubbles should drop for the flow in one of the directions, because the position of the inlet switches over, the ability to discharge the bubbles will be promoted by the force of the flow of the liquid, and as a result a lack of supply of the liquid fuel will not be prone to occurring, and hence stable operation can be carried out over a prolonged period.

Moreover, because the air pump AP that feeds air to the air electrode 108 is also used as fuel supply means for the fuel electrode 107 (first and second feeding means for feeding the liquid fuel in the first and second fuel tanks C1 and C2 out to the fuel electrode 107 side), compared with the case that the fuel is supplied to the fuel electrode 107 using a liquid pump provided separately to the air pump AP that feeds air to the 108 as conventionally, the apparatus can be made smaller and lighter in that only one motor is required. Furthermore, in the case that the fuel is supplied to the fuel electrode 107 using a liquid pump, startup has only been possible if priming water is provided, but with the present embodiment, because the air pump AP that feeds air to the air electrode 108 is also used for supplying fuel for the fuel electrode 107, such priming water is unnecessary, and hence reliable startup can be realized.

Moreover, the air pump AP that feeds air to the air electrode 108 is also used for the injection of high-concentration methanol from the methanol storage vessel C4 into the first fuel supply flow path 116, and hence it is not necessary to use a pump made of a special methanol-resistant material, and this is suitable for conveying small amounts of methanol. Even in the case that the fuel cell is turned upside down and hence air comes into contact with the methanol outlet of the methanol storage vessel C4, the methanol can be injected in reliably.

Moreover, in the case of a weight separation type circulation tank, with a portable fuel cell, there is a risk of the fuel cell being turned upside down, in which case it will not be possible to discharge carbon dioxide gas, and moreover the liquid surface will vacillate and hence the liquid surface sensor will malfunction, and furthermore there has been a problem that in the case that there is vibration, the circulation tank is shuffled, and hence a large amount of bubbles get into the liquid, causing the air pump to malfunction; however, with the embodiment described above, the first and second fuel tanks C1 and C2 are formed in a pipeline shape, and hence the liquid surface between the methanol and the air is constant, not depending on the orientation of the fuel cell, and thus stable operation can be expected.

Moreover, in particular, in each of the gas-liquid separators L1 and L2 provided between the fuel supply flow path 116 or 117 connected to the fuel electrode 107 and the fuel tank C1 or C2, not only is the first gas extracting member 134 made to face onto the first gas-liquid separation chamber 131 on the fuel supply flow path 116 or 117 side, but moreover the second gas extracting member 135 is made to face onto the second gas-liquid separation chamber 132 which is connected to the fuel tank C1 or C2 side, and hence even in the case that dissolved carbon dioxide gas forms bubbles K in the fuel tank C1 or C2, this gas can be discharged into the second gas flow path 137 well, and thus a situation in which, even though methanol aqueous solution remains in the second fuel tank C2, the bubbles K in the section S52 are detected by the sensor and hence it is mistakenly judged that the methanol aqueous solution in the second fuel tank C2 has run out can be prevented, and hence the reliability is improved. Moreover, bubbles K do not collect in the second gas-liquid separation chamber 132 of the gas-liquid separator L1 or L2, and hence the methanol aqueous solution in the second fuel tank C2 can be fed to the fuel electrode 107 via the fuel supply flow path 117 well without stagnating at this place, and thus the ability to supply the methanol aqueous solution to the fuel electrode 107 can be improved, and hence the electricity generating performance of the fuel cell can be improved.

Moreover, the heights of the gas-liquid separation chambers 131 and 132 that face onto the gas extracting members 134 and 135 respectively in each of the gas-liquid separators L1 and L2 are set to be not more than the maximum bubble growth diameter in the direction of gravity which depends on the surface tension of the methanol aqueous solution, and hence regardless of the orientation of the gas-liquid separator L1 or L2, the carbon dioxide gas that is the gas in the gas-containing liquid supplied into the gas-liquid separation chamber 131 or 132 will contact the gas extracting member 134 or 135 before reaching the maximum bubble growth diameter, and hence will be discharged through the gas extracting member 134 or 135 into the gas flow path 136 or 137 well; even in the case that the fuel cell is used as a portable fuel cell and is turned upside down, the gas-liquid mixed fluid can thus be separated into the gas and the liquid reliably and well regardless of the orientation of the fuel cell, and the gas such as carbon dioxide gas can be discharged well.

Here, a more detailed description will be given of the heights of the gas-liquid separation chambers 131 and 132 that face onto the gas extracting members 134 and 135 respectively in each of the gas-liquid separators L1 and L2, i.e. the maximum bubble growth diameter in the direction of gravity which depends on the surface tension of the methanol aqueous solution.

In general, the passing pressure for the gas through the gas extracting member 134 or 135 and the passing pressure P for the liquid through the moistened liquid extracting member 133 are theoretically given by the following formula, taking the pore diameter of the porous material to be D, the surface tension of the liquid to be T, and the contact angle between the liquid and the porous material to be A.

$$P=(1/D)\cdot 4\cdot T\cdot (\cos A)$$

Here, if the contact angle between the liquid and the porous material exceeds 90°, then a pressure P discharging the liquid from the pores will act.

On the other hand, in the case that the contact angle between the liquid and the porous material is less than 90°, a pressure P that discharges gas from the pores into which the gas-containing liquid has entered will act. Note, however, that in the case of being dry, even if the contact angle is less than 90°, if the value of the contact angle is high then a holding pressure will act when the liquid flows out from the pore outlets and hence it will become difficult for the liquid to permeate through; it is thus preferable for the contact angle to be close to 0°.

Figure 18:
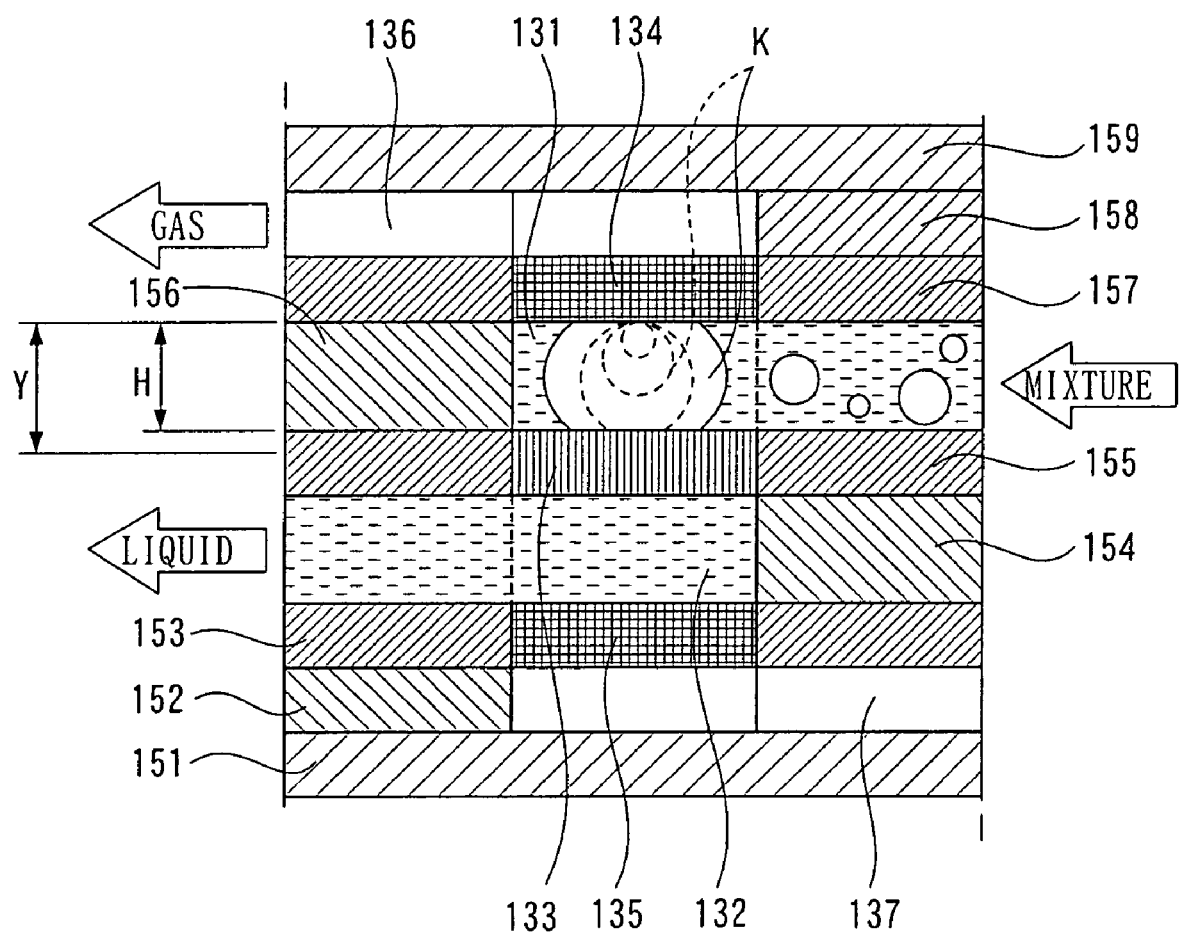
FIG. 18 is a sectional view showing an operation when the height inside a gas-liquid separation chamber of the gas-liquid separator of the fifth embodiment has been set to be not more than the maximum bubble growth diameter in the direction of gravity.

Furthermore, to set the height 131 or 132 of the gas-liquid separation chamber 131 or 132 formed by the liquid extracting member 133 and the gas extracting member 134 or 135 to be not more than a specific distance, here the thickness of the flow path plate 154 or 156 is set as shown in FIGS. 18 and 4. A description will now be given comparing with the comparative example shown in FIG. 19.

Figure 19:
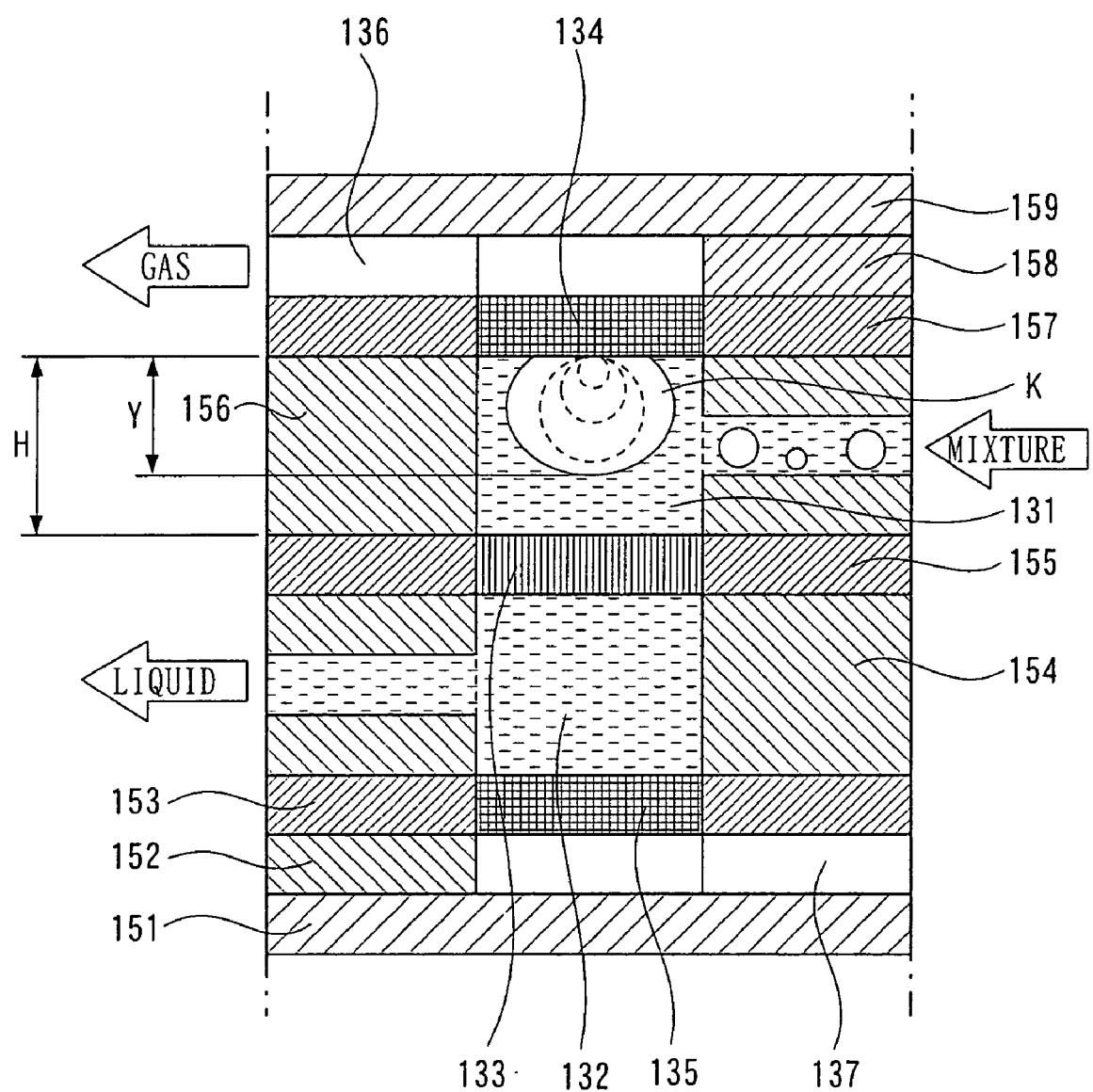
FIG. 19 is a sectional view showing a comparative example in which the height inside the gas-liquid separation chamber is high.

The height H of the gas-liquid separation chamber 131 or 132 is the distance between the liquid extracting member 133 and the gas extracting member 134 or 135 which are disposed facing each other; in the case that this height H is too great as shown in FIG. 19, if the orientation of the gas-liquid separator L1 or L2 becomes such that the gas extracting member 134 or 135 is at the bottom in the direction of gravity, then the liquid will cover the gas extracting member 134 or 135 due to gravity, and thus the outlet for the gas will be lost, and hence the gas-liquid separating ability will be lost.

However, it was found through experiments that if the height H of each of the gas-liquid separation chambers 131 and 132 (the gap between the gas extracting member 134 or 135 and the liquid extracting member 133) is made to be not more than a specific distance, then a good separating ability is obtained. That height is a height not more than the maximum bubble film growth height Y in the direction of gravity.

As shown in FIG. 19, bubbles K rise in the liquid due to buoyancy, and hence each bubble K sticks to the liquid extracting member 133 at the top in the direction of gravity. The liquid extracting member 133 allows the liquid to progressively permeate therethrough without allowing the gas to pass therethrough, and hence the bubbles K gradually gather together and grow.

As shown by the dashed lines, as a bubble K grows the bubble shape progressively changes from a sphere to an oval shape due to buoyancy, and a phenomenon is observed in which once the volume of the bubble K exceeds a certain value, change in the bubble diameter in the direction of gravity ceases, and the bubble K expands in only the sideways direction. The distance at the time that the change in the bubble diameter in the direction of gravity ceases (the distance shown by arrow Y) is called the maximum bubble growth diameter in the direction of gravity.

As with the comparative example shown in FIG. 19, in the case that the height H of the gas-liquid separation chamber 131 or 132 as determined by the thickness of the flow path plate 154 or 156 is greater than the maximum bubble growth diameter in the direction of gravity shown by the arrow Y, the liquid in the gas-containing liquid will cover the whole surface of the gas extracting member 134 or 135 which is at the bottom and hence the flowing out of the gas will cease. As the liquid passes through the liquid extracting member 133 which is at the top, bubbles K will then stick to the surface of the liquid extracting member 133 and grow, and eventually a bubble film of thickness equal to the maximum bubble growth diameter Y in the direction of gravity will cover the liquid extracting member 133 and thus the discharge of the liquid will also stop, and hence the gas-liquid separating ability will be lost.

In contrast with this, as shown in FIG. 18, in the case that the thickness of the flow path plate 154 or 156 is set such that the height H of the gas-liquid separation chamber 131 or 132 is not more than the maximum bubble growth diameter in the direction of gravity shown by the arrow Y, bubbles will grow on the surface of the liquid extracting member 133 but the bubbles K will come into contact with the gas extracting member 134 or 135 before reaching the maximum bubble growth diameter, and hence the gas extracting member 134 or 135 will adsorb and absorb the bubbles K and discharge the bubbles K into the gas outflow flow path 136 or 137, and thus even in the worst case scenario that the gas extracting member 134 or 135 is at the bottom in the direction of gravity, the gas-liquid separation will be able to operate normally.

As shown in FIG. 4, this maximum bubble height Y in the direction of gravity depends on the surface tension of the liquid, being approximately 6 mm in the case of pure water at 74 mN/m, and being approximately 3 mm in the case of methanol, ethanol or acetone at approximately 23 mN/m. That is, the limit value of the height H of the gas-liquid separation chamber 131 or 132 varies according to the surface tension of the liquid used.

Consequently, if the height H of each of the gas-liquid separation chambers 131 and 132 is made to be not more than 6 mm in the case that the liquid is water, or not more than approximately 3 mm in the case that the liquid is a methanol aqueous solution, then even if the gas-liquid separator L1 or L2 has been turned on its side or upside down, the gas-liquid separator L1 or L2 will operate reliably with no loss of the ability to separate the gas-containing liquid into the gas and the liquid.

Furthermore, in the embodiment described above, due to each of the gas-liquid separators L1 and L2 being constituted by laminating the plurality of flow path plates 151 to 159 together, the fuel cell can be made small and thin, and can be used particularly suitably as a fuel cell for portable equipment.

Moreover, in the embodiment described above, a description of the case that the gas-liquid separators L1 and L2 are used as constituent elements of a fuel cell has been given, but there is no limitation thereto, with it also being possible to suitably use such a gas-liquid separator for gas-liquid separation on medical infusions, in a microchemical analysis system, or the like, with it being possible to carry out gas-liquid separation well for the case that the gas-containing liquid flows in both directions.

What is claimed is:

1. A gas-liquid separator for receiving a gas-containing liquid having a gas mixed therein and for separating such gas from a liquid, the gas-liquid separator comprising:
   a gas-liquid separation chamber,
   an inlet for depositing a gas-containing liquid into said separation chamber,
   a liquid extracting member for passing liquid therethrough but restricting gas from passing therethrough, and
   a gas extracting member for allowing gas to pass therethrough but restricting liquid from passing therethrough,
   wherein such liquid has a surface tension characteristic and a maximum bubble growth diameter in a gravity direction which corresponds to such surface tension characteristic, and a height of the gas-liquid separation chamber is not more than such maximum bubble growth diameter and
   at least one of the gas extracting member and the liquid extracting member has a reinforcing porous plate in close contact therewith.

2. The gas-liquid separator according to claim 1, wherein the liquid extracting member comprises a plate or membrane of either porous glass or porous polytetrafluoroethylene that has been subjected to hydrophilic treatment.

3. The gas-liquid separator according to claim 1, wherein the gas extracting member comprises a plate or membrane of one of a material containing porous glass as a substrate having a hydrophobic polymer such as a fluoropolymer applied onto the substrate surface containing pores, a material manufactured by subjecting a fluorine-based substrate to perforation, or porous polytetrafluoroethylene.

4. The gas-liquid separator according to claim 1, wherein the gas-liquid separation chamber comprises a plurality of walls defining an outer periphery of the gas-liquid separation chamber including at least a first wall comprising one of the liquid extracting member and the gas extracting member, and a second, facing wall comprising the other of the liquid extracting member and the gas extracting member, wherein the height of the gas-liquid separation chamber is a maximum gap between the first wall and the second wall.

5. The gas-liquid separator according to claim 1, wherein the gas-liquid separation chamber comprises a plurality of walls including at least a first wall having one of the liquid extracting member and the gas extracting member, a second wall facing the first wall, and a side wall between and substantially perpendicular to the first wall and the second wall, said side wall having the other of the liquid extracting member and the gas extracting member, wherein the height of the gas-liquid separation chamber is a maximum gap between the first wall and the second wall.

6. The gas-liquid separator according to claim 1, wherein such gas-containing liquid comprises water and a gas and wherein the height of the gas-liquid separation chamber is not more than 6 mm.

7. The gas-liquid separator according to claim 1, wherein such gas-containing liquid comprises a methanol aqueous solution and a gas, and wherein the height of the gas-liquid separation chamber is not more than 3 mm.

* * * * *